US010880253B2

(12) United States Patent
Woodward et al.

(10) Patent No.: US 10,880,253 B2
(45) Date of Patent: Dec. 29, 2020

(54) AUTOMATED DISPLAY STATE OF ELECTRONIC MAIL ITEMS

(71) Applicant: Microsoft Technology Licensing, LLC, Redmond, WA (US)

(72) Inventors: James V. Woodward, Snoqualmie, WA (US); Jonathan Gabriel Picariello, Kenmore, WA (US); Jonathan Norman Scott, Snohomish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 159 days.

(21) Appl. No.: 15/360,441

(22) Filed: Nov. 23, 2016

(65) Prior Publication Data

US 2018/0145942 A1 May 24, 2018

(51) Int. Cl.
*H04L 12/58* (2006.01)
*G06Q 10/10* (2012.01)

(52) U.S. Cl.
CPC ............ *H04L 51/22* (2013.01); *G06Q 10/107* (2013.01); *H04L 51/26* (2013.01)

(58) Field of Classification Search
CPC ........ H04L 51/22; H04L 51/26; G06Q 10/107
See application file for complete search history.

(56) References Cited

U.S. PATENT DOCUMENTS

| 7,831,676 | B1 | 11/2010 | Nagar |
| 8,743,151 | B1* | 6/2014 | Fulcher ............... G06F 3/04817 |
| | | | 345/684 |
| 9,077,672 | B2 | 7/2015 | Khoo |
| 9,395,864 | B2 | 7/2016 | Leong et al. |
| 2006/0129602 | A1 | 6/2006 | Witriol et al. |
| 2007/0171029 | A1* | 7/2007 | Inbarajan ............... G06Q 10/00 |
| | | | 340/425.5 |
| 2007/0179945 | A1 | 8/2007 | Marston et al. |

(Continued)

OTHER PUBLICATIONS

Anonymous, "Accordion (GUI)—Wikipedia", Retrieved from «https://en.wikipedia.org/w/index.php?title=Accordion_(GUI)&oldid=742365269», Oct. 3, 2016, 3 Pages.

(Continued)

*Primary Examiner* — Austin J Moreau
*Assistant Examiner* — Juan C Turriate Gastulo
(74) *Attorney, Agent, or Firm* — Merchant & Gould P.C.

(57) ABSTRACT

An efficient email display is provided. Elements in the email that are determined to be useful or relevant to a particular recipient are displayed and elements that are determined not to be useful or relevant to the recipient are removed from view. A received email is parsed for identifying elements that can be collapsed or expanded when displayed to the recipient. A predetermined value is applied to each element based on the content type. The weight of one or more of the elements is adjusted by applying a weight based on one or more weight factors. A collapsed or expanded display state is assigned to each content element based on the adjusted value. Further, the email message is rendered in the email client application interface to the recipient, where elements having the expanded display state are displayed and elements having the collapsed display state are hidden.

20 Claims, 15 Drawing Sheets

(56) References Cited

U.S. PATENT DOCUMENTS

| | | | | |
|---|---|---|---|---|
| 2009/0157825 A1* | 6/2009 | Barbee | ............... | G06Q 10/107 709/206 |
| 2011/0010182 A1* | 1/2011 | Turski | ............... | G06Q 10/107 705/1.1 |
| 2012/0254321 A1 | 10/2012 | Lindsay et al. | | |
| 2013/0332850 A1* | 12/2013 | Bovet | ............... | H04L 51/22 715/752 |
| 2015/0088784 A1* | 3/2015 | Dhara | ............... | G06N 5/02 706/11 |
| 2017/0357422 A1* | 12/2017 | Jon | ............... | G06F 3/0481 |

OTHER PUBLICATIONS

"International Search Report and Written Opinion Issued in PCT Application No. PCT/US2017/062455", dated Feb. 7, 2018, 12 Pages.

Agarwal, Amit, "Digital inspiration: How to Prevent Gmail from Trimming your Email Signature", Published on: Dec. 18, 2014 Available at: http://www.labnol.org/internet/gmail-trimming-signature/28762/.

Smith, Trisha, "Responsive Email: Avoid Defections by Improving Mobile Experiences", Published on: Oct. 30, 2013 Available at: http://marketingland.com/responsive-email-creating-better-mobile-inbox-experiences-63014.

"Gmail Help: Use Gmail standard view with a screen reader", Retrieved on: Sep. 6, 2016 Available at: https://support.google.com/mail/answer/90559?hl=en.

"Stackoverflow: Show/Hide content in a Gmail email body", Published on: Jun. 1, 2013 Available at: http://stackoverflow.com/questions/9891812/show-hide-content-in-a-gmail-email-body.

"Office Action Issued in European Patent Application No. 17812151.3", dated Oct. 28, 2020, 6 Pages.

* cited by examiner

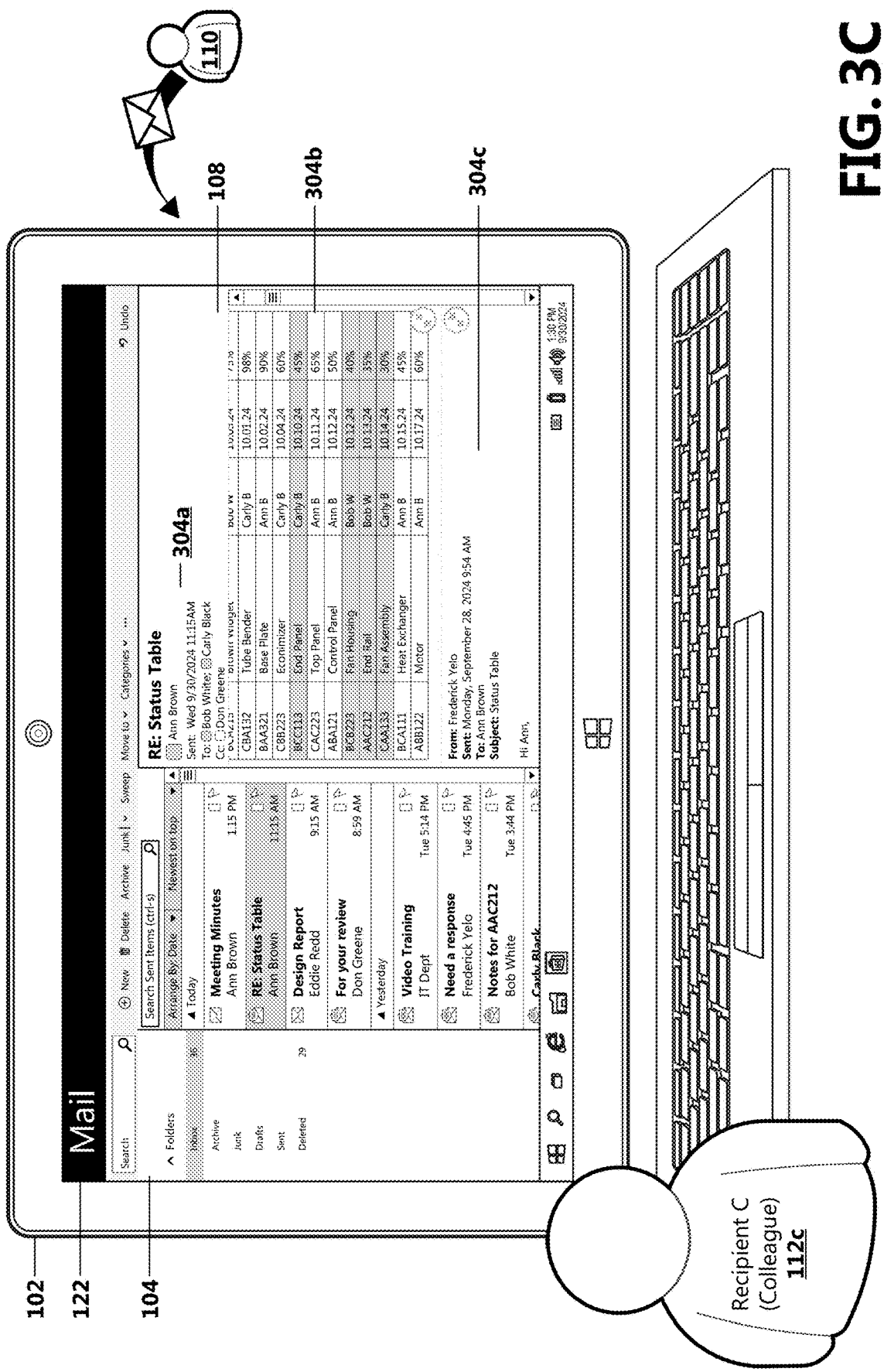

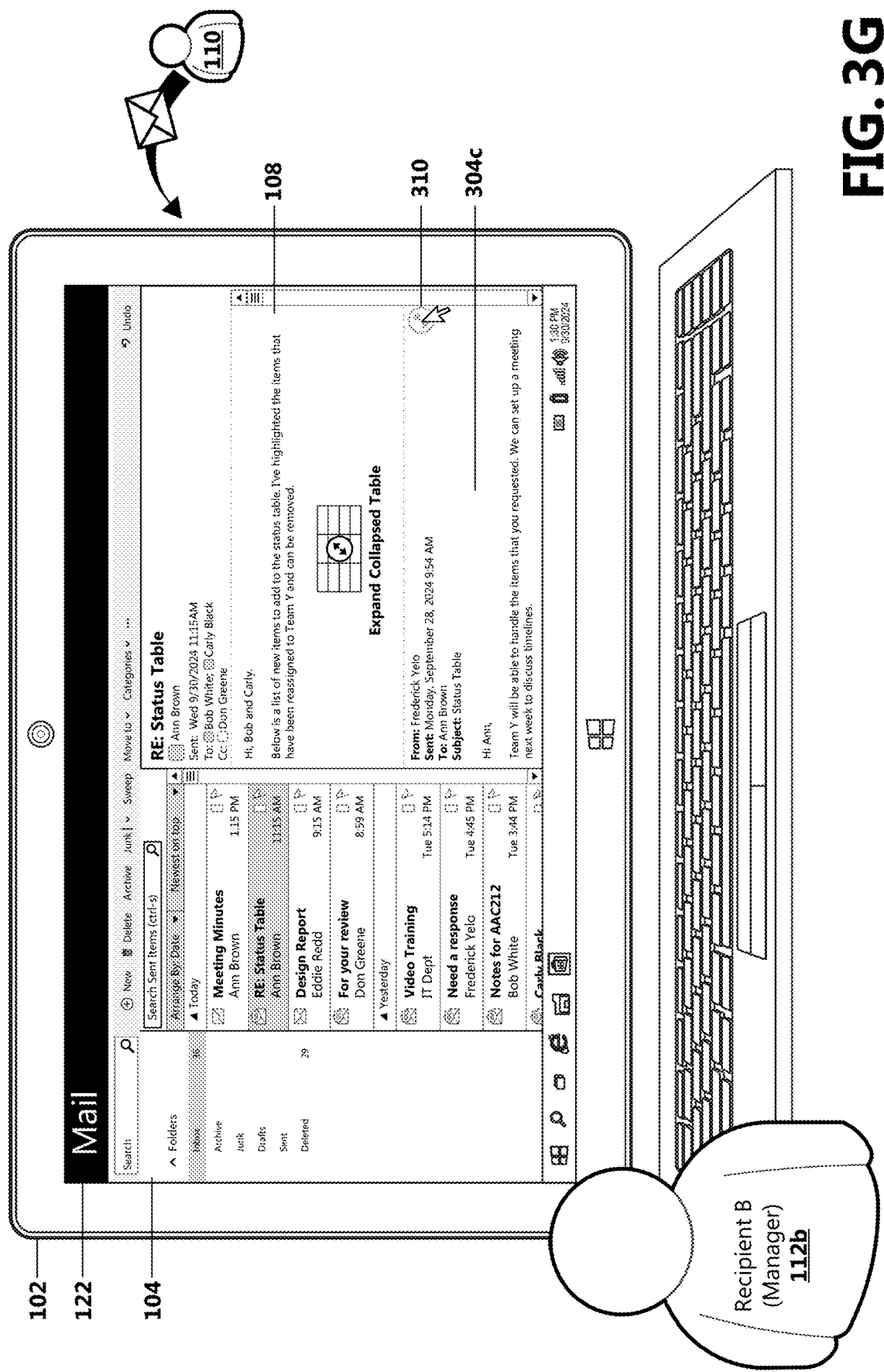

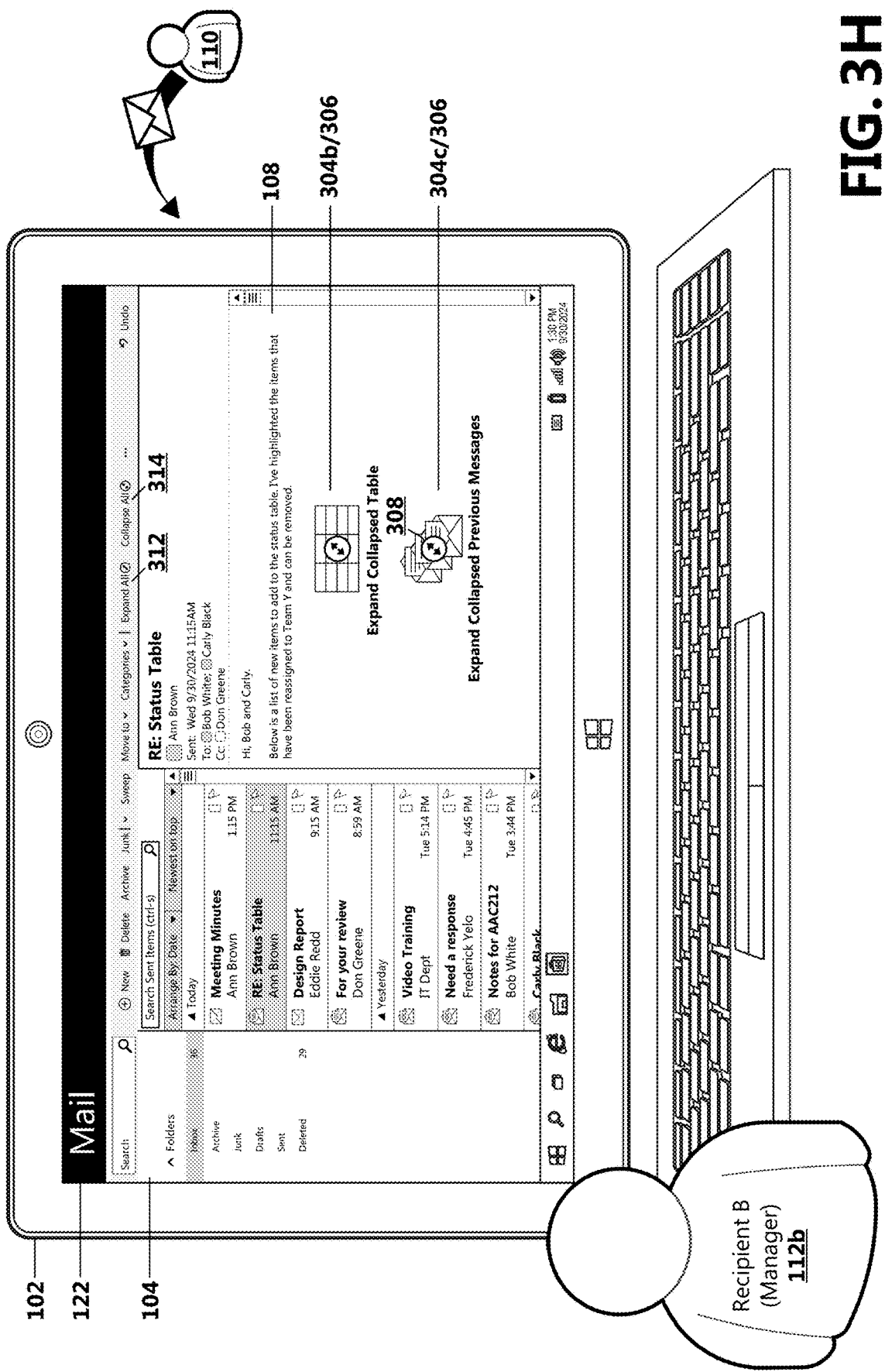

AUTOMATED DISPLAY STATE OF ELECTRONIC MAIL ITEMS

BACKGROUND

Users of email applications typically receive a large number of emails daily. In addition to textual content in the email body, email messages may also include other types of content, such as tables, images, signatures, message headers, previous messages if the message is part of a conversation thread, attachments, embedded content, etc. When working collaboratively with teammates, users often include files or data in an email message to corroborate what the user is communicating in text in the message. This content can clutter the body of the message and can become a distraction to the recipient. The recipient may need to scroll through the content that is not relevant to him/her to view the parts of the message that are of importance to the recipient. As can be appreciated, it can be time-consuming and inefficient to scroll through content that is not relevant to the recipient.

SUMMARY

This summary is provided to introduce a selection of concepts in a simplified form that are further described below in the Detailed Description section. This summary is not intended to identify key features or essential features of the claimed subject matter, nor is it intended as an aid in determining the scope of the claimed subject matter.

Method, systems and computer storage media are provided for enhancing a user interface of an email client application to provide an efficient display of an email message. In particular, aspects are directed to: parsing a received electronic message for identifying elements that can be collapsed or expanded when displayed to the recipient; applying a predetermined value to each element based on the content type; adjusting the values by applying a weight based on an identity of the sender of the message; assigning one of a collapsed or expanded display state for each content element based on the adjusted value; and rendering the email message in the email client application interface to the recipient, where elements having the expanded display state are displayed and elements having the collapsed display state are hidden. The recipient is enabled to have varying views of the email message by selectively collapsing or expanding specific content elements.

By employing aspects of the present disclosure, an improved user experience is provided, where the email recipient is enabled to efficiently view an email message where elements that are determined to be useful or relevant to the recipient are displayed and elements that are determined not to be useful or relevant to the recipient are removed from view. By providing an efficient view of an email message, fewer processing resources are expended by the email client application to render non-useful or extraneous content, or to handle instructions for scrolling through the non-useful or extraneous content. Accordingly, the functionality of the computing device used to provide the email client application is thereby expanded and improved.

Examples are implemented as a computer process, a computing system, or as an article of manufacture such as a device, computer program product, or computer readable media. According to an aspect, the computer program product is a computer storage media readable by a computer system and encoding a computer program of instructions for executing a computer process.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the claims.

BRIEF DESCRIPTION OF THE DRAWINGS

The accompanying drawings, which are incorporated in and constitute a part of this disclosure, illustrate various aspects. In the drawings:

FIGS. 3B-3C are illustrations of an example user interface display generated by aspects of the email client application and rendered to a colleague of the sender, the UI display showing content elements of the email message rendered in an expanded display state;

FIG. 3G is an illustration of an example user interface display generated by aspects of the email client application and rendered to a manager of the sender, the UI display showing a first content element of the email message rendered in a collapsed display state and a selection being made by the recipient to collapse a second displayed content element of the email message;

FIG. 3H is an illustration of an example user interface display generated by aspects of the email client application showing the collapse of the second displayed content element;

DETAILED DESCRIPTION

Figure 1:
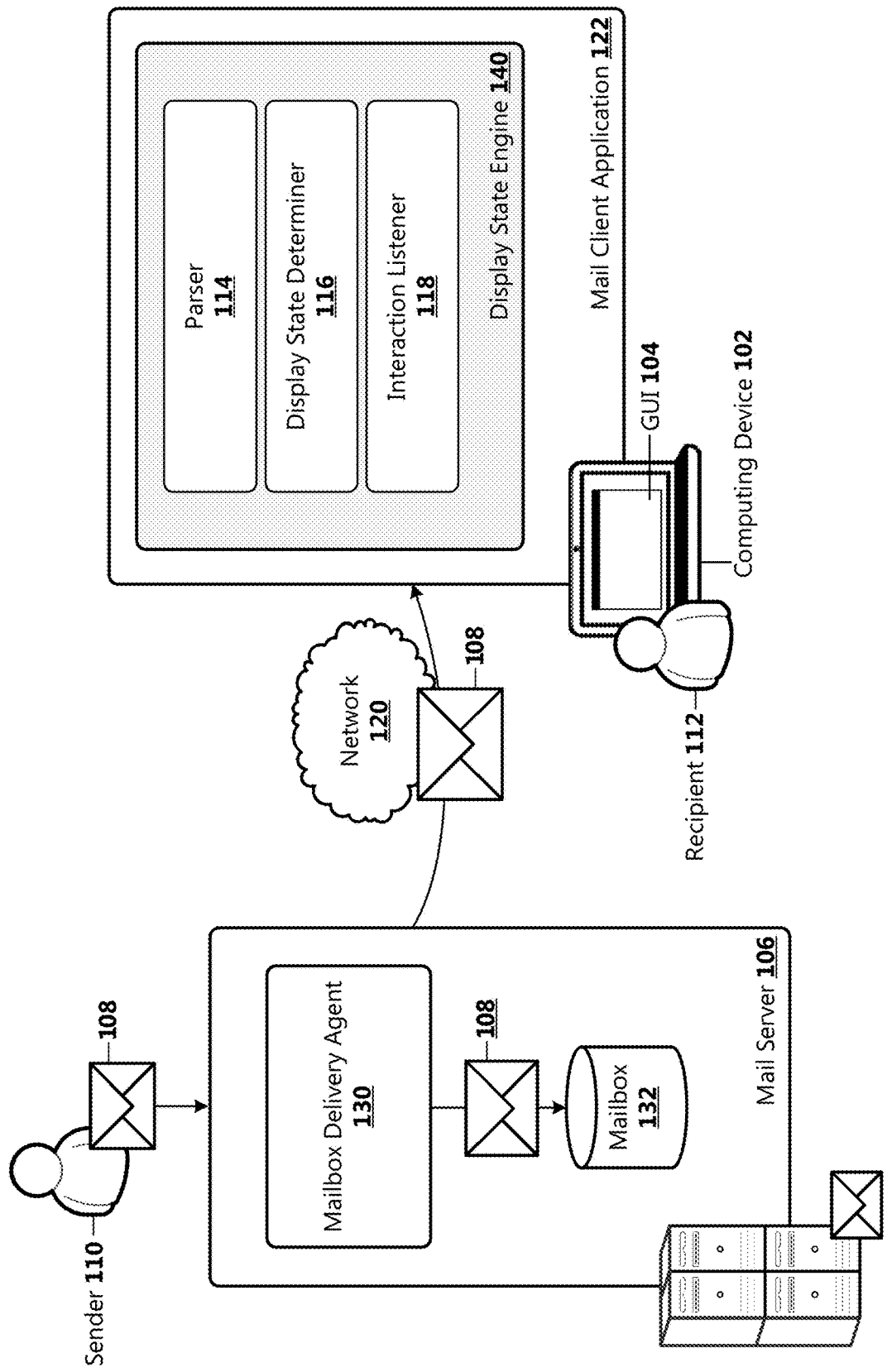
FIG. 1 is a block diagram of an example operating environment including a system for providing an efficient display of an email message.

The following detailed description refers to the accompanying drawings. Wherever possible, the same reference numbers are used in the drawings and the following description refers to the same or similar elements. While examples may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description is not limiting, but instead, the proper scope is defined by the appended claims. Examples may take the form of a hardware implementation, or an entirely software implementation, or an implementation combining software and hardware aspects. The following detailed description is, therefore, not to be taken in a limiting sense.

Aspects of the present disclosure are directed to a method, device, and computer storage media for providing an efficient display of an email message. Aspects improve computer efficiency for electronic mail item viewing, thus increasing computer performance by assigning a display state to elements in the email, where elements that are determined to be relevant or useful to the recipient are displayed, and elements that are determined to be less relevant or useful to the recipient are hidden. The display state for each element is determined by automatically parsing a received email for identifying elements that can be collapsed or expanded when the email is displayed to the recipient, applying a predetermined value to each element based on the content type, adjusting the weight of one or more of the elements by applying a weight based on one or more weight factors, and assigning a collapsed or expanded display state to each content element based on the adjusted value. Accordingly, elements having the expanded display state are displayed and elements having the collapsed display state are hidden.

With reference now to FIG. 1, a block diagram of one example operating environment 100 including a display state engine 140 is shown. As illustrated, the example environment 100 includes a computing device 102. The computing device 102 illustrated in FIG. 1 is illustrated as a laptop computer; however, as should be appreciated, the computing device 102 may be one of various types of computing devices (e.g., a tablet computing device, a desktop computer, a mobile communication device, a laptop computer, a laptop/tablet hybrid computing device, a large screen multi-touch display, a gaming device, a smart television, a wearable device, or other type of computing device) for executing applications for performing a variety of tasks. The hardware of these computing devices is discussed in greater detail in regard to FIGS. 5, 6A, 6B, and 7.

A user may utilize an application on the computing device 102 for a variety of tasks, which may include, for example, to write, calculate, draw, take and organize notes, organize, prepare presentations, send and receive electronic mail, browse web content, make music, and the like. According to examples, the computing device 102 is operative to execute a mail client application 122. The user may utilize the mail client application 122 executing on the computing device 102 to receive, view, interact with, compose, or generate electronic messages 108, such as emails, meeting requests, or other types of electronic messages. According to an aspect, the mail client application 122 uses a standard protocol for receiving and sending electronic messages.

In some examples, the mail client application 122 is a thick client application, which is stored locally on the computing device 102. In other examples, the mail client application 122 is a thin client application (i.e., web application) that resides on a remote server and is accessible over a network 120, such as the Internet or an intranet. A thin mail client application 122 may be hosted in a browser-controlled environment or coded in a browser-supported language and reliant on a common web browser to render the application executable on the computing device 102. According to examples, a graphical user interface (GUI) 104 is provided by the mail client application 122 for enabling the user to interact with functionalities of the application and with electronic messages 108 through manipulation of graphical icons, visual indicators, and the like.

According to an aspect, a mail server 106 is operative to receive incoming electronic messages 108 from a sending user 110, and forward outgoing electronic messages 108 for delivery to a recipient user 112. In some examples, the mail server 106 is operative to transmit an electronic message 108 to one or more intended recipients by routing the electronic message 108 to one or more mailbox delivery agents 130. The mail server 106 includes or is communicatively attached to a plurality of mailbox delivery agents 130, wherein each mailbox delivery agent 130 is connected to a user's mailbox 132 from which the mail client application 122 is operative to retrieve an electronic message 108, for example, over a network 120.

As illustrated in FIG. 1, the mail client application 122 includes or is in communication with the display state engine 140, illustrative of a software module, system, or device operative to provide an efficient display of email message content. In one example, the computing device 102 includes a display state application programming interface (API), operative to enable the mail client application 122 executing on the computing device 102 to employ the systems and methods of the present disclosure via stored instructions. In another example, the mailbox delivery agent 130 includes or is in communication with the display state engine 140, wherein methods performed by aspects of the display state engine are executed on the mail server 106.

According to examples, the display state engine 140 includes a parser 114, a display state determiner 116, and an interaction listener 118. The parser 114 is illustrative of a software module, system, or device operative to parse a received email message 108 to identify various content elements within the message that can be collapsed or expanded. Content in an electronic message 108 may comprise one or more elements present or embedded in the electronic message including, but not limited to: textual content, macros, images, movies, sound files, tables, and metadata. According to an aspect, the parser 114 is operative to identify primary textual content elements, wherein a primary textual content element is distinguished as textual content within the email message body and includes content that the recipient 112 is likely to want to view. In some examples, primary textual content includes content that is new to a conversation. For example, an email message 108 may be part of a conversation and may include a running list of succeeding replies sent between correspondents starting with the original email.

According to another aspect, the parser 114 is operative to identify secondary content elements, wherein a secondary content element is distinguished as content that is part of an email message 108 that may be desirable to hide when the message is displayed to the recipient 112. In some examples, a secondary content element includes textual content, such as a signature, automatically generated text that is inserted by the sender's email system, or content that is part of previous replies that may or may not be considered redundant and not useful to the recipient 112. In other examples, a secondary content element includes non-textual content, such as a table, an image, an email header, etc. In some examples, a secondary content element may be identified by its tag. For example, data comprising the electronic message 108 content may be stored in an elemental form by the electronic message, such as in Extensible Markup Language (XML), Java Script Object Notation (JSON) elements, HTML, or another declaratory language interpretable by a schema. The schema may define sections or content items via tags, and may apply various properties to content items via direct assignment or hierarchical inheritance.

The display state determiner 116 is illustrative of a software module, system, or device operative to analyze the identified secondary content elements within the email message 108 for determining a display state for each secondary content element and assigning the determined display state to each secondary content element in the email message. For example, the display state may be a collapsed display state or an expanded display state. The display state determiner 116 is operative to apply predetermined values to identified secondary content element types and adjust the values based on weights corresponding to various determining factors. According to an example, a secondary content element having a higher value has an increased probability of being assigned a collapsed display state. For example, when a value of a secondary content element crosses a predetermined threshold value, the display state determiner 116 is operative to assign the collapsed display state to the secondary content element. A secondary content element having a value that is below the predetermined threshold value may be assigned the expanded display state.

According to an aspect, a first determinant of the display state for a secondary content element is the type of content. For example, a predetermined value is applied to each secondary content element based on its content type (e.g., on a scale from 1-10, a table may have a value of 6, an image may have a value of 4, a signature may have a value of 9), wherein a higher value corresponds to content types that are considered to be redundant, less-interesting, or less-useful to the recipient 112.

According to an aspect, the display state determiner 116 is operative to apply weights to secondary content element values based on the identity of the sender 110. For example, one determinant of the display state for a secondary content element is the organizational relationship distance between the sender 110 of the email message 108 and the recipient 112 of the email message. According to an example, the value applied to each secondary content element according to the content type is adjusted based on the organizational relationship distance between the sender 110 of the email message 108 and the recipient 112 of the email message, wherein a greater distance between the sender and the recipient corresponds to a higher weight, thus increasing the value of a secondary content element and the probability that the secondary content element will be assigned a collapsed display state.

Figure 2:
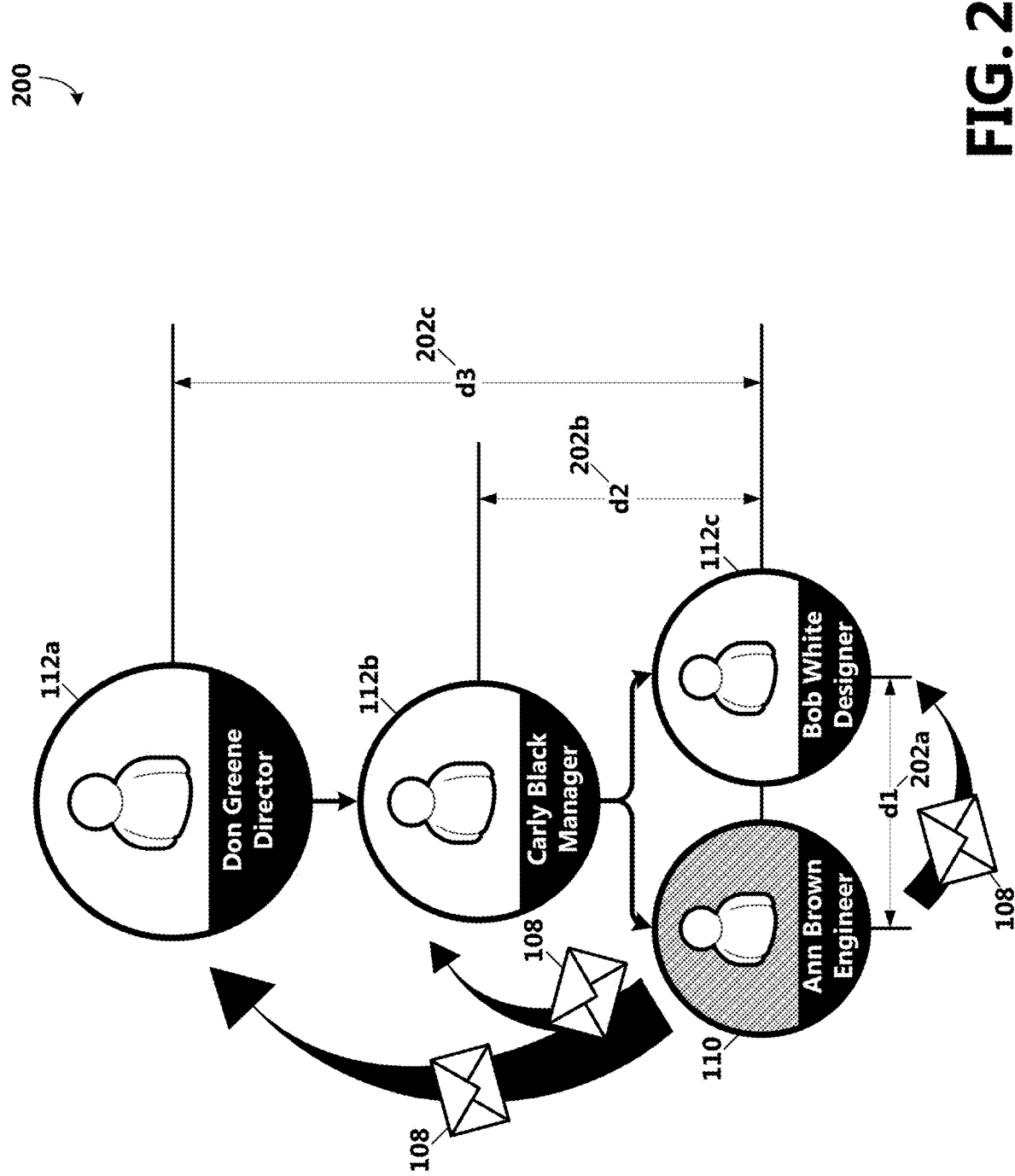
FIG. 2 is an illustration of an example organizational chart showing organizational relationship distances between a sender of an email message and recipients of the email message.

With reference now to FIG. 2, an example organizational chart 200 showing organizational relationship distances 202*a-c* (collectively, 202) between a sender 110 of an email message 108 and recipients 112*a,b,c* of the email message is illustrated. For example, the example organizational chart 200 graphically illustrates the relationships between individuals in an example department, where the sender 110 of the email message 108, "Ann Brown," is an Engineer, and recipients 112 of the email message include a colleague "Bob White" (recipient 112*c*), a manager "Carly Black" (recipient 112*b*), and an executive-level director "Don Greene" (recipient 112*a*).

In one example, a first relationship weight is associated with the organizational relationship distance d1 202*a* between the sender 110 and the sender's colleague "Bob White" (recipient 112*c*). For example, the relationship weight associated with d1 202*a* may be a lower weight given that the sender 110 and the recipient 112*c* are colleagues, and thus the organizational relationship distance d1 between the sender and recipient may be small. When the weight associated with d1 202*a* is applied to the values of content elements in the email message 108 sent by the sender 110 and received by recipient 112*c*, the probability that the content elements will be assigned an expanded display state increases.

In another example, a second relationship weight is associated with the organizational relationship distance d2 202*b* between the sender 110 and the sender's manager "Carly Black" (recipient 112*b*). For example, the relationship weight associated with d2 202*b* may be a higher weight given the manager-employee relationship. When the weight associated with d2 202*b* is applied to the values of content elements in the email message 108 sent by the sender 110 and received by recipient 112*b*, the probability that the content elements will be assigned a collapsed display state increases, at least to a small degree, in relation to colleague "Bob White" (recipient 112*c*).

In another example, a third relationship weight is associated with the organizational relationship distance d3 202*c* between the sender 110 and the executive director "Don Greene" (recipient 112*a*). For example, the relationship weight associated with d3 202*c* may be a higher weight given the greater organizational relationship distance d3 between the sender 110 and the senior management position of the recipient 112*a*. When the weight associated with d3 202*c* is applied to the values of content elements in the email message 108 sent by the sender 110 and received by recipient 112*a*, the probability that the content elements will be assigned a collapsed display state is further increased. According to one example, the display state determiner 116 is operative to reference the organizational chart 200 for determining organizational relationship distances 202. In another example, the display state determiner 116 is operative to reference the sender's mail contact properties, wherein the contact properties specify the sender's role in an organization.

With reference again to FIG. 1, the display state determiner 116 is further operative to adjust the values of secondary content element values based on other factors, such as based on the specific sender 110, a number of recipients 112 of an email message 108, a type of computing device 102 on which the email message is being viewed, the recipient involvement level, learned behaviors of the recipient, etc. As should be appreciated, other weight factors are possible and are within the scope of the present disclosure.

In one example, a weight corresponding to the number of recipients 112 of the email message 108 may be applied to the value of a secondary content element such that the value is increased when the number of recipients is higher. Accordingly, an increased number of recipients 112 of an email message 108 increases the probability that secondary content elements in the message will be assigned a collapsed display state.

As another example, a weight corresponding to the type of computing device 102 executing the email client application 122 may be applied to the value of a secondary content element such that the value is increased when the computing device has a smaller display space. Accordingly, when the email client application 122 is executing on a small form factor device, such as a phone, the probability that secondary content elements in the message will be assigned a collapsed display state is increased.

As another example, a weight associated with the recipient involvement level may be applied to the value of a secondary content element such that the value is decreased when the recipient 112 is a primary recipient of an email message 108 (e.g., included in a "To:" line of the email message) or increased when the recipient 112 is a secondary recipient of an email message (e.g., included in a "Cc:" or "Bc:" line of the email message). Accordingly, when the recipient 112 receives an email message 108 in which the recipient is a secondary recipient or included in the "Cc:" line, the probability that secondary content elements in the message will be assigned a collapsed display state is increased.

According to aspects, upon determination and assignment of a collapsed display state or an expanded display state to each secondary content element in an email message 108, the email client application 122 is operative to render the email message in the GUI 104, wherein rendering includes displaying primary textual content element and displaying all secondary content elements having an assigned expanded display state. In some examples, the email client application 122 is operative to display a collapse control for each displayed secondary content element assigned an expanded display state. For example, the collapse control allows the email recipient 112 to selectively collapse the displayed secondary content element. According to an aspect, secondary content elements having an assigned collapsed display state may be hidden from view. In some examples, the email client application 122 is operative to display an expansion control for each hidden secondary content element to provide an indication of the hidden content element and to allow the recipient 112 to selectively expand the hidden content element.

According to an aspect, the interaction listener 118 is illustrative of a software module, system, or device operative to monitor collapse and expansion interactions actuated by the email recipient 112 for adjusting a value associated with a specific secondary content element type or for adjusting a weight associated with a specific weight factor, such as the specific sender 110, the organizational relationship distance between the sender and the recipient, the recipient list size, the recipient involvement level, or the computing device type.

For example, when a recipient 112 regularly selects to expand hidden secondary content elements in email messages 108 from senders 110 that are separated from the recipient in an organizational chart 200, the interaction listener 118 collects data associated with the user's interactions and uses the collected data to learn that the recipient frequently expands hidden secondary content regardless of the user's organizational relationship distance with the sender. Accordingly, the interaction listener 118 adjusts the weight associated with organizational relationship distance such that the probability that secondary content elements in email messages 108 sent to the recipient 112 will be assigned an expanded display state is increased regardless of the distance 202 between the sender and the recipient in the organizational chart 200.

As another example, when a recipient 112 commonly selects to expand hidden secondary content elements in email messages 108 from a particular sender 110, the interaction listener 118 collects data associated with the user's interactions, and uses the collected data to learn that the recipient frequently expands hidden secondary content from the particular sender. Accordingly, the interaction listener 118 adjusts the weight associated with the particular sender 110 such that the probability that secondary content elements in email messages 108 sent to the recipient 112 from the particular sender will be assigned an expanded display state is increased.

As another example, when a recipient 112 repeatedly selects to collapse or hide video files in email messages 108, the interaction listener 118 collects data associated with the user's interactions, and uses the collected data to learn that the recipient frequently collapses video files. Accordingly, the interaction listener 118 adjusts the value associated with video files such that the probability that video files in subsequently received email messages will be assigned a collapsed display state is increased.

Figure 3A:
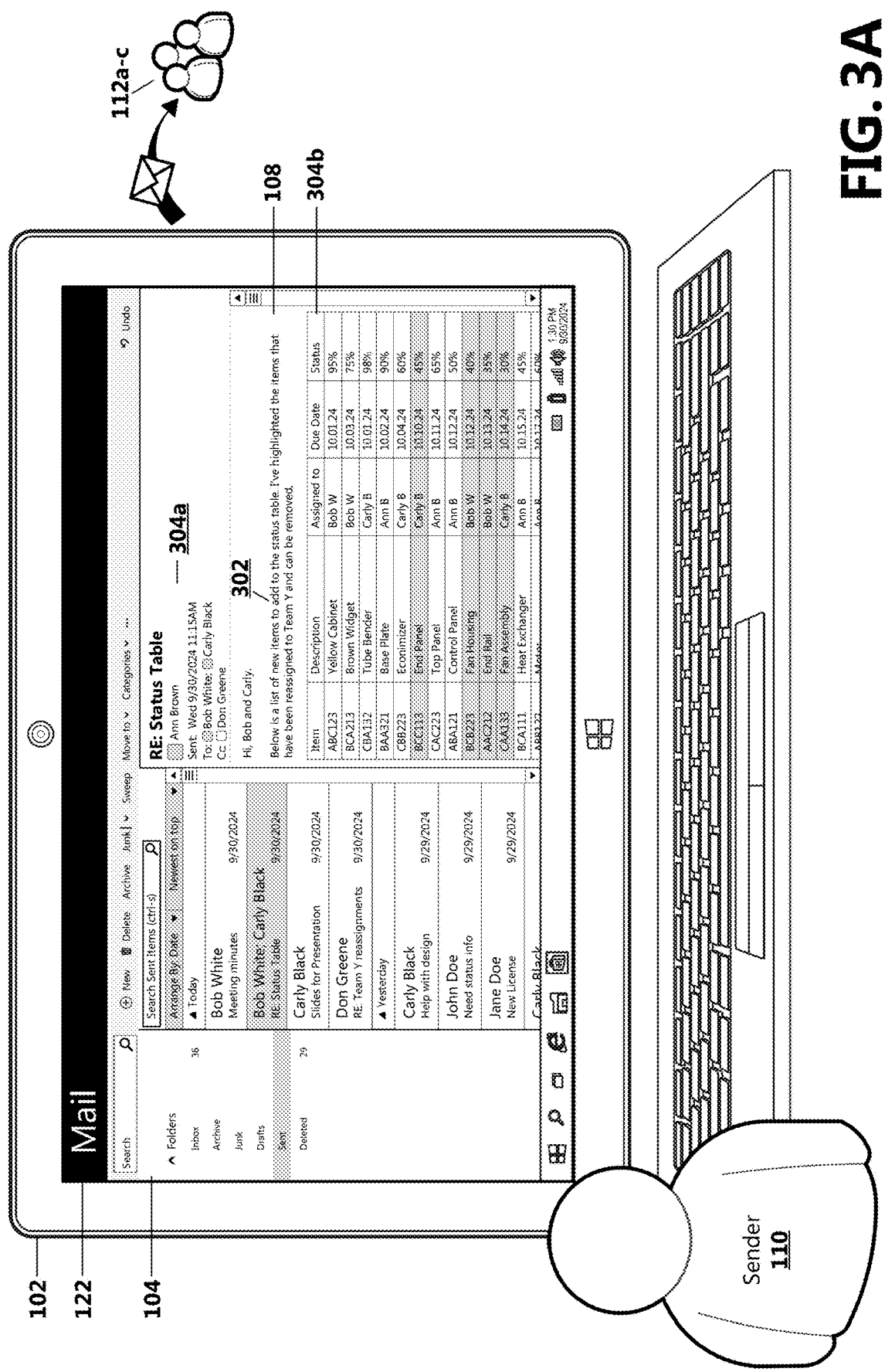
FIG. 3A is an illustration of an example user interface display generated by aspects of the email client application showing the original email message sent by the sender.

With reference now to FIG. 3A, an example email client application 122 GUI 104 displayed on a computing device 102 including a display of an email message 108 authored and sent by a user (sender 110) to a plurality of recipients 112a-c is illustrated. As illustrated, the email message 108 includes primary textual content 302 and various secondary content elements 304. For example, the secondary content includes textual content, such as a signature, automatically generated text that is inserted by the sender's email system, and content that is part of previous replies, and non-textual content, such as an email header 304a, a table 304b, an image, or other attachment or embedded content element.

Figure 3B:
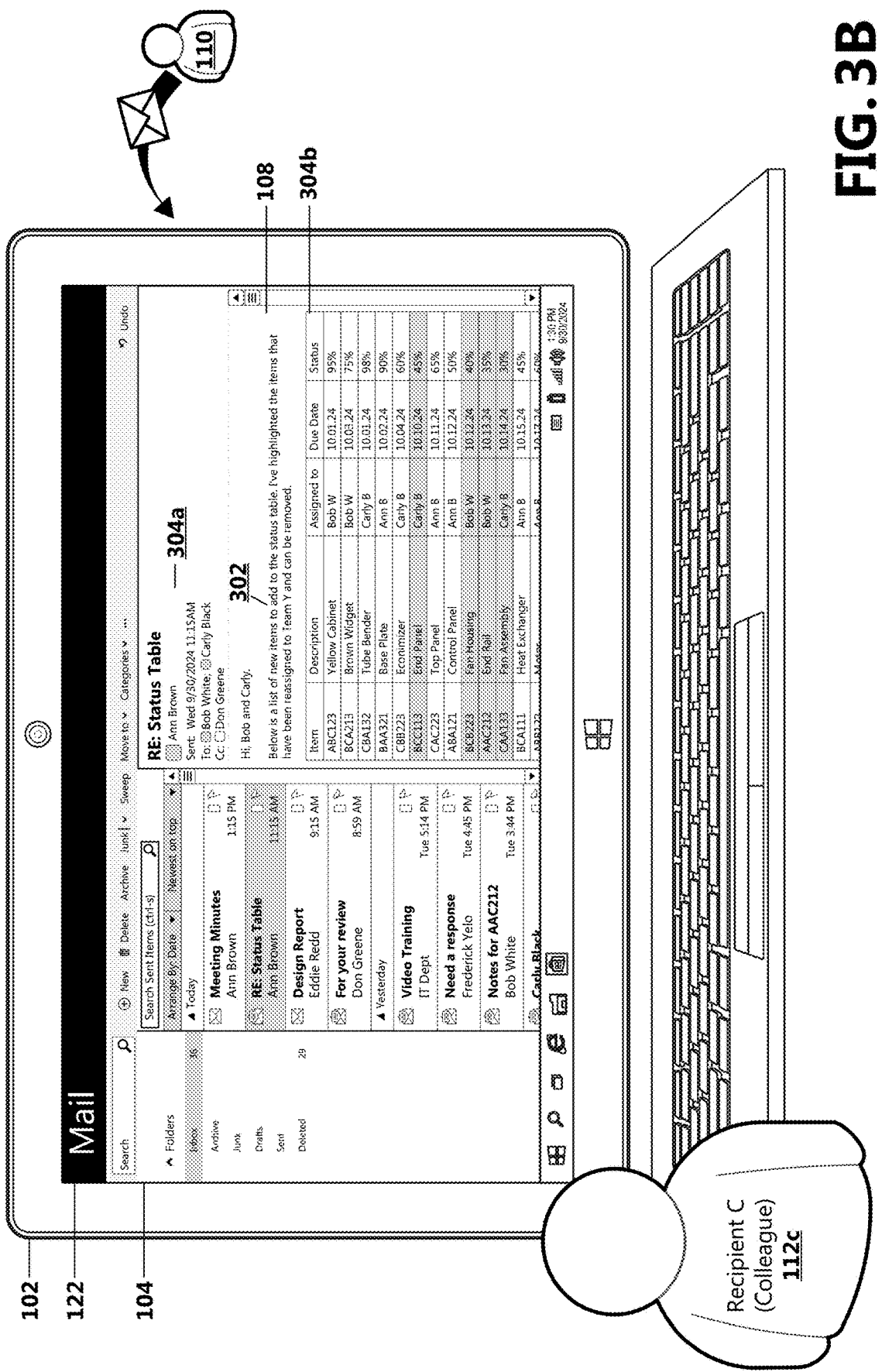

With reference now to FIGS. 3B and 3C, an example email client application 122 GUI 104 is shown displayed on the computing device 102 utilized by recipient C 112c (the sender's colleague "Bob White"). For example, the GUI 104 includes a display of the email message 108 authored and sent by the sender 110. FIG. 3C shows a slightly scrolled-down view of the received email message 108 of FIG. 3B. According to aspects, when the email message 108 is received, the display state engine 140 identifies primary textual elements 302 and secondary content elements 304, and analyzes the identified secondary content elements for determining a display state for each secondary content element. According to an example, a predetermined value is applied to the email header 304a, another predetermined value is applied to the table 304b, and another predetermined value is applied to the original email and previous replies 304c to the original email. Further, each of the values is adjusted according to one or more weights. According to an example, a weight is applied to the value of one or more of the secondary content elements 304, wherein the weight is associated with the identity of the sender 110. For example, the weight corresponds to the organizational relationship distance d1 202a between the sender 110 of the email message 108 and recipient C 112c, and the value of each of the one or more secondary content elements 304 is adjusted by the weight. In the example illustrated in FIGS. 3B and 3C, the organizational relationship distance d1 202a between the sender 110 and recipient C 112c is small given that the sender and recipient C are colleagues on a same team. Accordingly, the weight is small, which when applied to the value of each of the one or more secondary content elements 304, does not substantially increase the values nor the probability that each of the secondary content elements will be assigned a collapsed display state. As illustrated, the secondary content elements 304a,b,c are displayed in an expanded state. As should be appreciated, other weight factors may be applied for adjusting one or more of the secondary content element values.

Figure 3D:
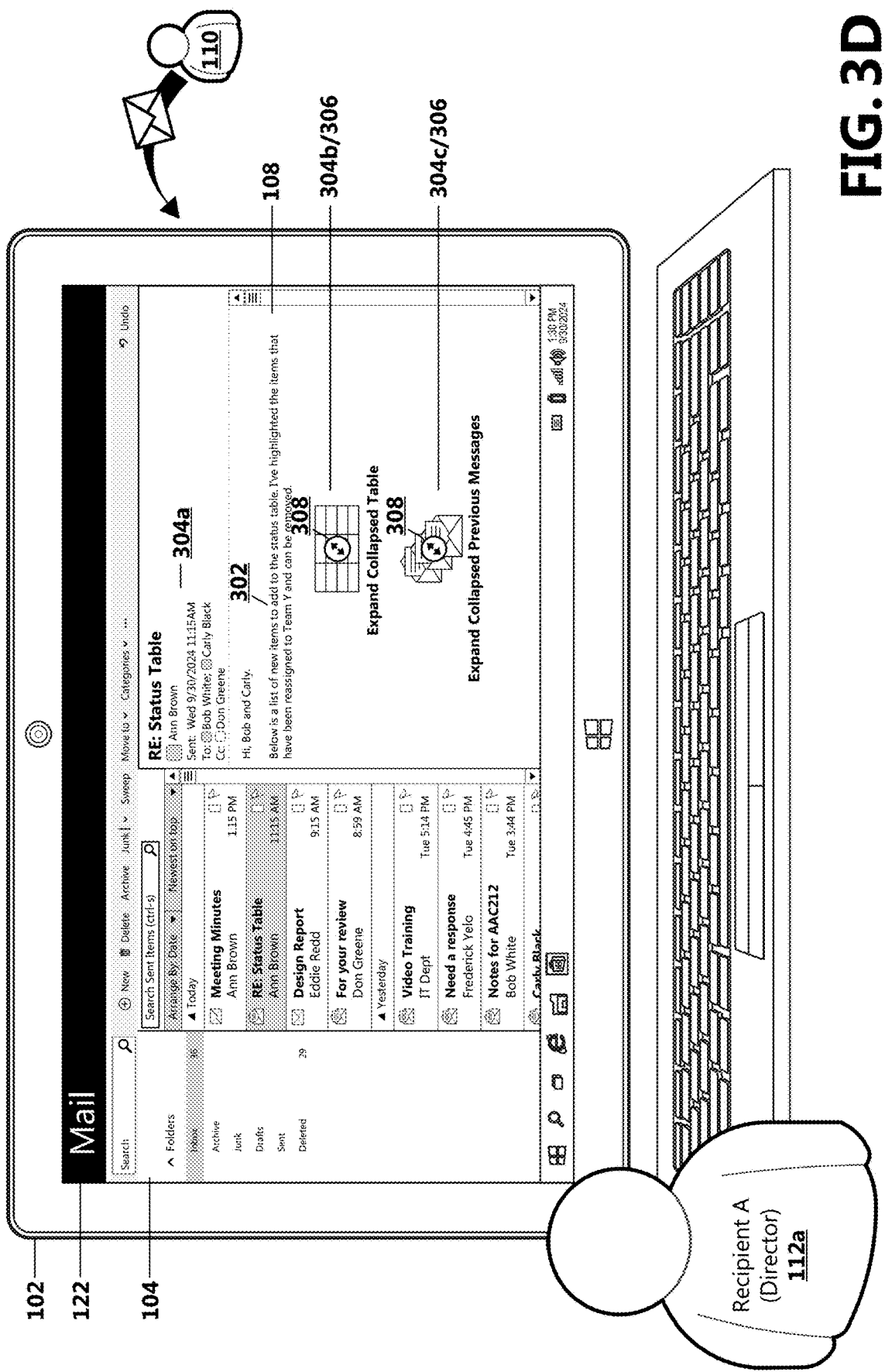
FIG. 3D is an illustration of an example user interface display generated by aspects of the email client application and rendered to an executive, the UI display showing content elements in a collapsed display state.

With reference now to FIG. 3D, an example email client application 122 GUI 104 is shown displayed on the computing device 102 utilized by recipient A 112a (the executive director "Don Greene"), wherein the GUI 104 includes a display of the email message 108 authored and sent by the sender 110 illustrated in FIG. 3A. Primary content elements 302 and secondary content elements 304 in the email message 108 are identified, and a value is assigned to each of the secondary content elements 304 based on the content element type. Further, each of the values is adjusted according to one or more weight factors. According to an example, a weight is applied to the value of one or more of the secondary content elements 304, wherein the weight is associated with the identity of the sender 110. For example, the weight corresponds to the organizational relationship distance d3 202c between the sender 110 of the email message 108 and recipient A 112a, and the value of each of the one or more secondary content elements 304 is adjusted by the weight. In the example illustrated in FIG. 3D, the organizational relationship distance d3 202c between the sender 110 and recipient A 112a may be determined to be sizeable based on a greater distance 202 between the sender 110 and recipient A 112a in the organizational chart 200. Accordingly, the organizational relationship distance weight is correspondingly greater, thus increasing the value of each of the one or more secondary content elements 304. According to examples, the greater distance 202 between the sender 110 and recipient A 112a in the organizational chart 200 increases the probability that the value of the one or more of the secondary content elements 304 will cross a predetermined threshold value, and thus be assigned a collapsed display state.

In one example, a secondary content element 304 in the collapsed display state may be completely removed from view. In another example and as illustrated in FIG. 3D, when rendered in the collapsed display state, a secondary content element 304 may be displayed as an icon 306 or other visual representation of the collapsed or hidden secondary content element. According to an aspect, when a secondary content element 304 is assigned a collapsed display state, an expansion control 308 associated with the collapsed secondary content element is provided for enabling the recipient 112 to selectively expand the collapsed element. For example, the expansion control 308 is an actuatable control, which when actuated by the user (email recipient 112), causes the email client application 122 to update the GUI 104 to expand the collapsed/hidden secondary content element. In some examples, the expansion control 308 is integrated with the icon 306 or other visual representation of the collapsed or hidden secondary content element. For example, the email recipient 112 is enabled to select the icon 306 or other visual representation associated with the collapsed or hidden secondary content element, and accordingly, the email client application 122 is instructed to expand the collapsed element.

Figure 3E:
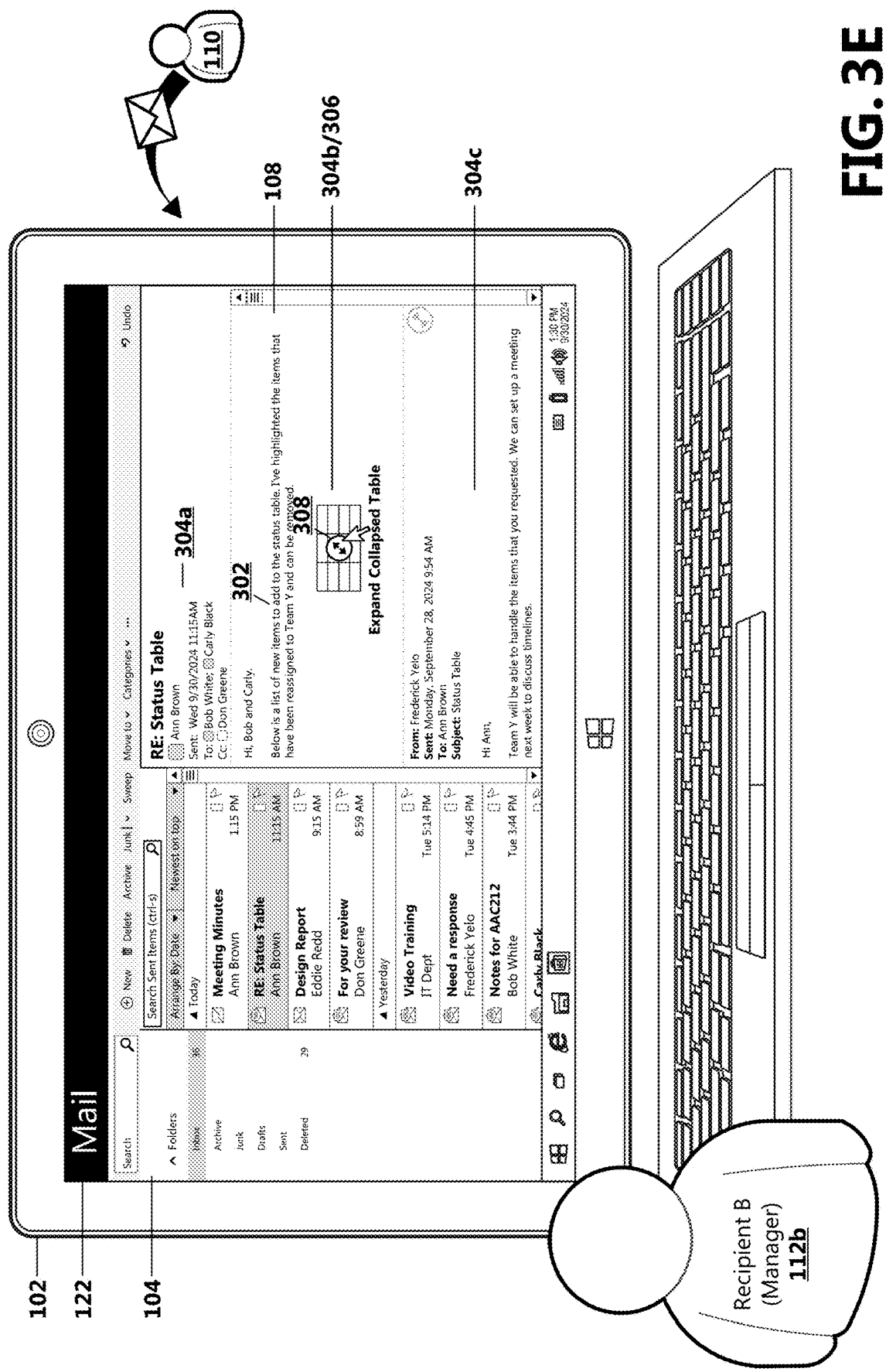
FIG. 3E is an illustration of an example user interface display generated by aspects of the email client application and rendered to a manager of the sender, the UI display showing a first content element of the email message rendered in an expanded display state and a selection being made by the recipient to expand a second hidden content element of the email message.

With reference now to FIG. 3E, an example email client application 122 GUI 104 is shown displayed on the computing device 102 utilized by recipient B 112b (the sender's manager "Carly Black"), wherein the GUI 104 includes a display of the email message 108 authored and sent by the sender 110 illustrated in FIG. 3A. Primary content elements 302 and secondary content elements 304 in the email message 108 are identified, and a value is assigned to each of the secondary content elements 304 based on the content element type. Further, each of the values is adjusted according to one or more weight factors. According to an example, a weight is applied to the value of one or more of the secondary content elements 304, wherein the weight is associated with the identity of the sender 110. For example, the weight corresponds to the organizational relationship distance d2 202b between the sender 110 of the email message 108 and recipient B 112b, and the value of each of the one or more secondary content elements 304 is adjusted by the weight.

In the example illustrated in FIG. 3E, given the manager-employee relationship between the sender 110 and recipient B 112b as illustrated in the example organizational chart 200 in FIG. 2, the organizational relationship distance weight is likely greater than the weight associated with the organizational relationship distance d1 202a between the sender and the sender's colleague, recipient 112c, and likely less than the weight associated with the organizational relationship distance d3 202c between the sender and the executive director, recipient 112a. Thus, when the organizational relationship distance weight is applied to each secondary content element value, the values may or may not increase to a value crossing the predetermined threshold value. In some examples, the probability that the value of the one or more of the secondary content elements 304 will cross a predetermined threshold value may be more dependent on the value corresponding to the content element type.

Figure 3F:
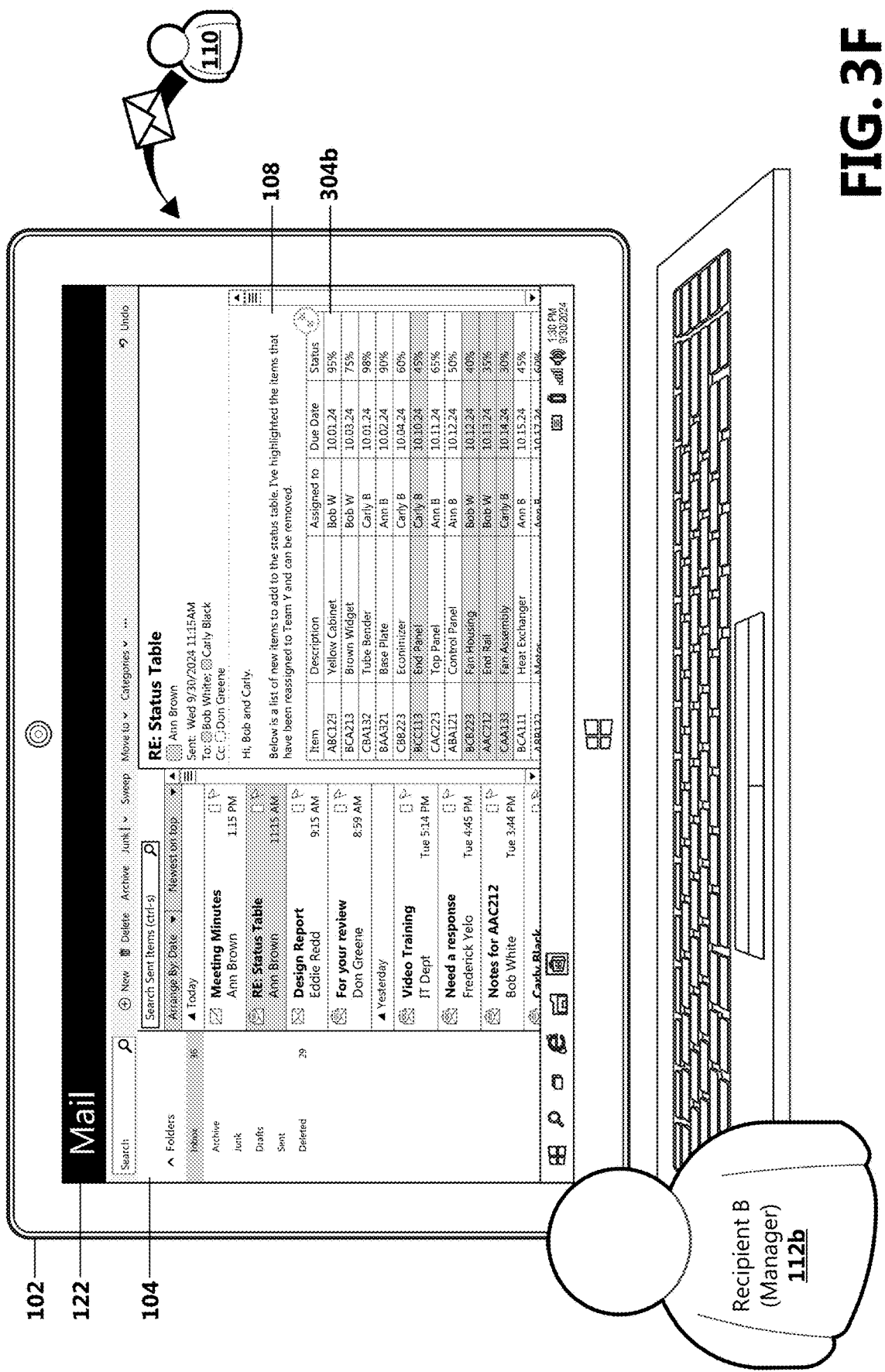
FIG. 3F is an illustration of an example user interface display generated by aspects of the email client application showing the expansion of the second hidden content element.

As illustrated in FIG. 3E, the secondary content element 304b embodied as a chart is assigned the collapsed display state and displayed as an icon 306 or other visual representation, while the secondary content element 304c embodied as the original email and previous replies 304c to the original email is assigned the expanded display state. As illustrated, the expansion control 308 associated with the collapsed secondary content element 304b is provided for enabling the recipient 112 to selectively expand the collapsed element. As stated above, the expansion control 308 may or may not be integrated with the icon 306 or other visual representation associated with the collapsed content element. As illustrated, the recipient 112b selects the expansion control 308, instructing the email client application 122 to expand the corresponding collapsed content element 304b. Accordingly, and as illustrated in FIG. 3F, the email client application 122 updates the GUI 104 to display the previously-hidden content element 304b embodied as a table.

With reference now to FIG. 3G, in some examples, a collapse control 310 is provided for displayed secondary content elements that have been assigned an expanded display state or for displayed secondary content elements 304 that were assigned a collapsed display state and that have been selectively expanded. As illustrated, the recipient 112b selects the collapse control 310, instructing the email client application 122 to collapse or hide the corresponding expanded secondary content element 304c. Accordingly, and as illustrated in FIG. 3H, the email client application 122 updates the GUI 104 to collapse the previously-expanded secondary content element 304c embodied as the original email 108 and previous replies to the original email. In the collapsed display state, an icon 306 or other visual representation associated with the secondary content element 304c is displayed. Further an expansion control 308 associated with the collapsed secondary content element 304c is provided for enabling the recipient 112 to selectively expand the collapsed element.

As described above, the display state engine 140 monitors collapse and expansion interactions actuated by the email recipient 112, and adjusts the value associated with a specific element type corresponding to the collapsed or expanded interaction, or adjusts the weight associated with one or more specific weight factors, such as the weight associated with the specific sender 110, the organizational relationship distance 202 between the sender and the recipient 212, the recipient list size, the recipient involvement level, or the computing device type.

In some examples and as illustrated in FIG. 3H, an expand-all command 312 and a collapse-all command 314 may be provided in the GUI 104, for example, in a toolbar. The expand-all command 312 is a user-actuatable control, which when actuated by the recipient 112, causes the email client application 122 to expand all collapsed secondary content elements 304 in the currently-viewed email 108. The collapse-all command 314 is a user-actuatable controls, which when actuated by the recipient 112, causes the email client application 122 to collapse or hide all expanded secondary content elements 304 in the currently-viewed email 108. According to examples, the functionality of expanding all collapsed secondary content elements 304 in a currently-viewed email 108 may be actuated via other methods, such as via a particular gesture, a shortcut keyboard command, or voice command. As will be appreciated, the examples illustrated in FIGS. 3A-3H are non-limiting examples; other GUIs and email layouts with different secondary elements and arrangements thereof are possible and are within the scope of the present disclosure.

Figure 4:
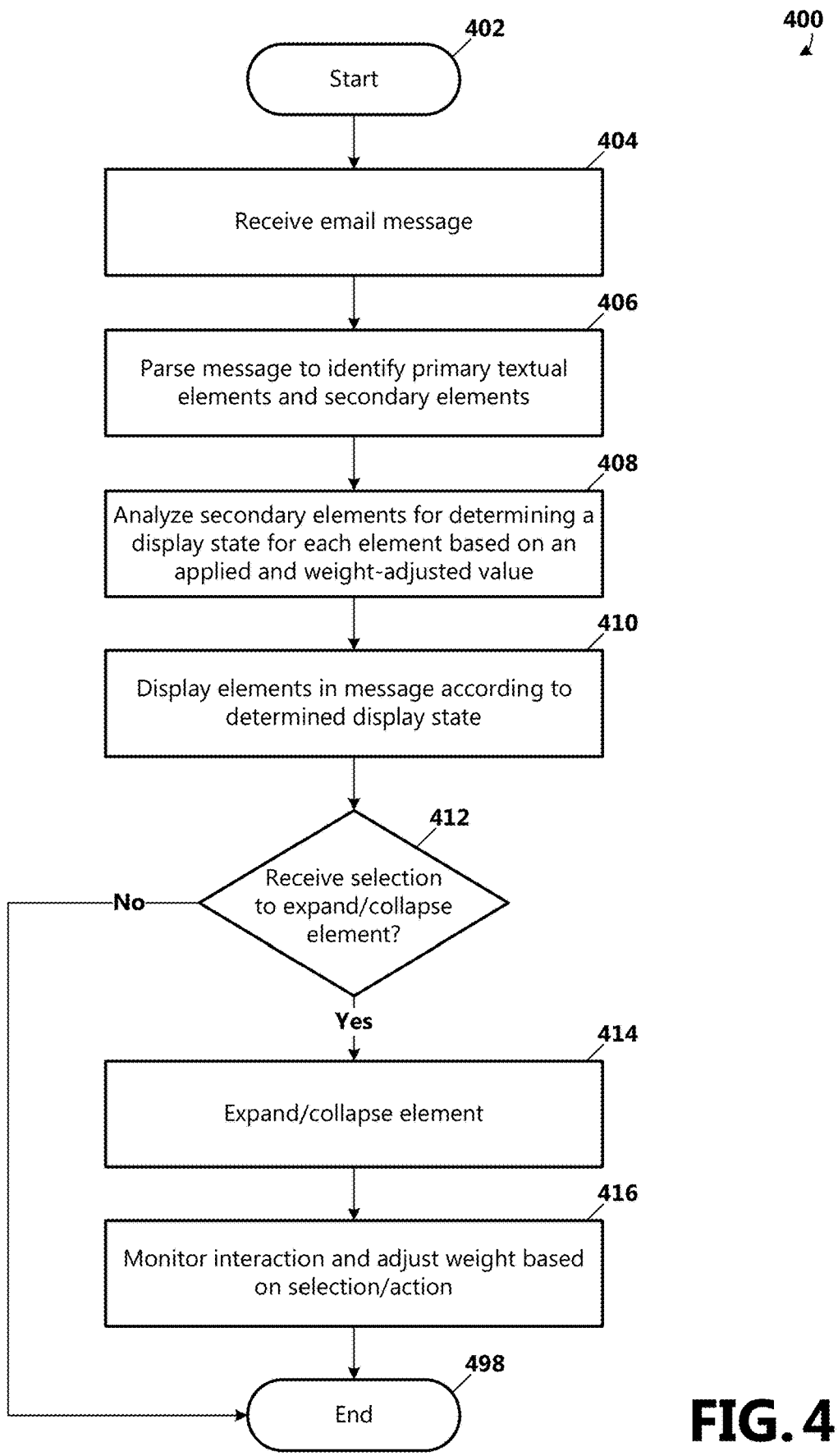
FIG. 4 is a flow chart showing general stages involved in an example method for providing an efficient display of an email message.

Having described an operating environment and various user interface display examples with respect to FIGS. 1-3H, FIG. 4 is a flow chart showing general stages involved in an example method 400 for providing an efficient display of an email message. With reference now to FIG. 4, the method 400 begins at start OPERATION 402, and proceeds to OPERATION 404, where an email message 108 is received. For example, an email message 108 authored by a sender 110 and addressed to one or more recipients 112 is delivered to an electronic mailbox associated with one of the one or more recipients. When the recipient 112 opens the email client application 122, the application retrieves the messages in the recipient's mailbox including the email message 108.

The method 400 proceeds to OPERATION 406, where the email message 108 is parsed to identify various content elements within the message that can be collapsed or expanded. For example, primary textual content elements 302 and secondary content elements 304 in the email message 108 are identified. In some examples, secondary content elements are identified by their tags.

The method 400 proceeds to OPERATION 408, where each of the identified secondary content elements 304 is analyzed for determining and assigning a display state. As described above, a predetermined value is applied to each identified secondary content elements 304 according to the content element type. Further, one or more of the applied values are adjusted based on one or more weight factors, wherein a secondary content element having a higher value has an increased probability of crossing a predetermined threshold value and being assigned a collapsed display state, and a secondary content element having a value that is below the predetermined threshold value may be assigned the expanded display state. According to examples, a weight factor is associated with one or more of: the specific sender 110, a number of recipients 112 of an email message 108, a type of computing device 102 on which the email message is being viewed, the recipient involvement level, or learned behaviors of the recipient.

Upon assigning an expanded display state or a collapsed display state to each secondary content element 304 in the email message 108, the method 400 proceeds to OPERATION 410, where the email message is displayed in the GUI 104, and the secondary content elements in the message are displayed according to their assigned display state. For example, secondary content elements 304 having an expanded display state are displayed, and secondary content element having a collapsed display state are hidden or collapsed.

The method 400 proceeds to DECISION OPERATION 412, where a determination is made as to whether to expand a collapsed secondary content element or to collapse an expanded secondary content element. In one example, the recipient 110 may select an expansion control 308 corresponding to a collapsed secondary content element to selectively expand the collapsed content element. In another example, the recipient 110 may select a collapse control 310 corresponding to an expanded secondary content element to selectively collapse or hide the expanded content element. In another example, the recipient 112 may select an expand-all command 312 to selectively expand all collapsed secondary content elements in the email message 108. In another example, the recipient may select a collapse-all command 314 to selectively collapse or hide all expanded secondary content elements in the email message 108.

When the recipient 112 does not select to expand collapsed content or to collapse expanded content, the method 400 ends at OPERATION 498. When a determination is made to expand or collapse one or more secondary content elements 304, the method 400 proceeds to OPERATION 414, where the GUI 104 is updated to expand or collapse one or more secondary content elements according to the recipient's selection. At OPERATION 416, the user's interaction with the display state of the one or more secondary content elements is monitored and the value associated with a specific element type corresponding to the collapsed or expanded interaction is adjusted, or the weight associated with one or more specific weight factors, such as the weight associated with the specific sender 110, the organizational relationship distance 202 between the sender and the recipient 212, the recipient list size, the recipient involvement level, or the computing device type, is adjusted. The method 400 ends at OPERATION 498.

While implementations have been described in the general context of program modules that execute in conjunction with an application program that runs on an operating system on a computer, those skilled in the art will recognize that aspects may also be implemented in combination with other program modules. Generally, program modules include routines, programs, components, data structures, and other types of structures that perform particular tasks or implement particular abstract data types.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, according to an aspect, the aspects and functionalities described herein operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which implementations are practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 5:
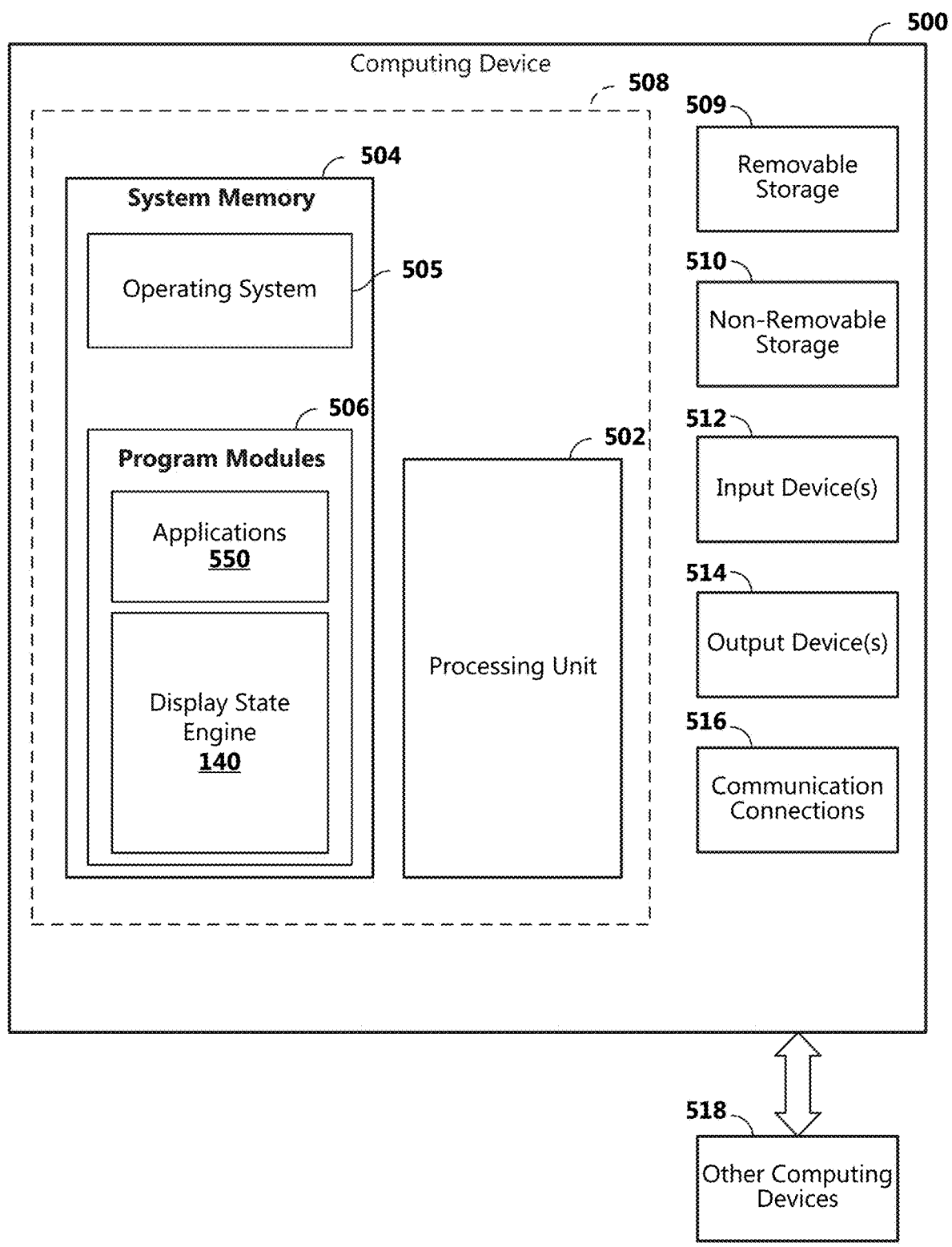
FIG. 5 is a block diagram illustrating example physical components of a computing device.
Figure 6A:
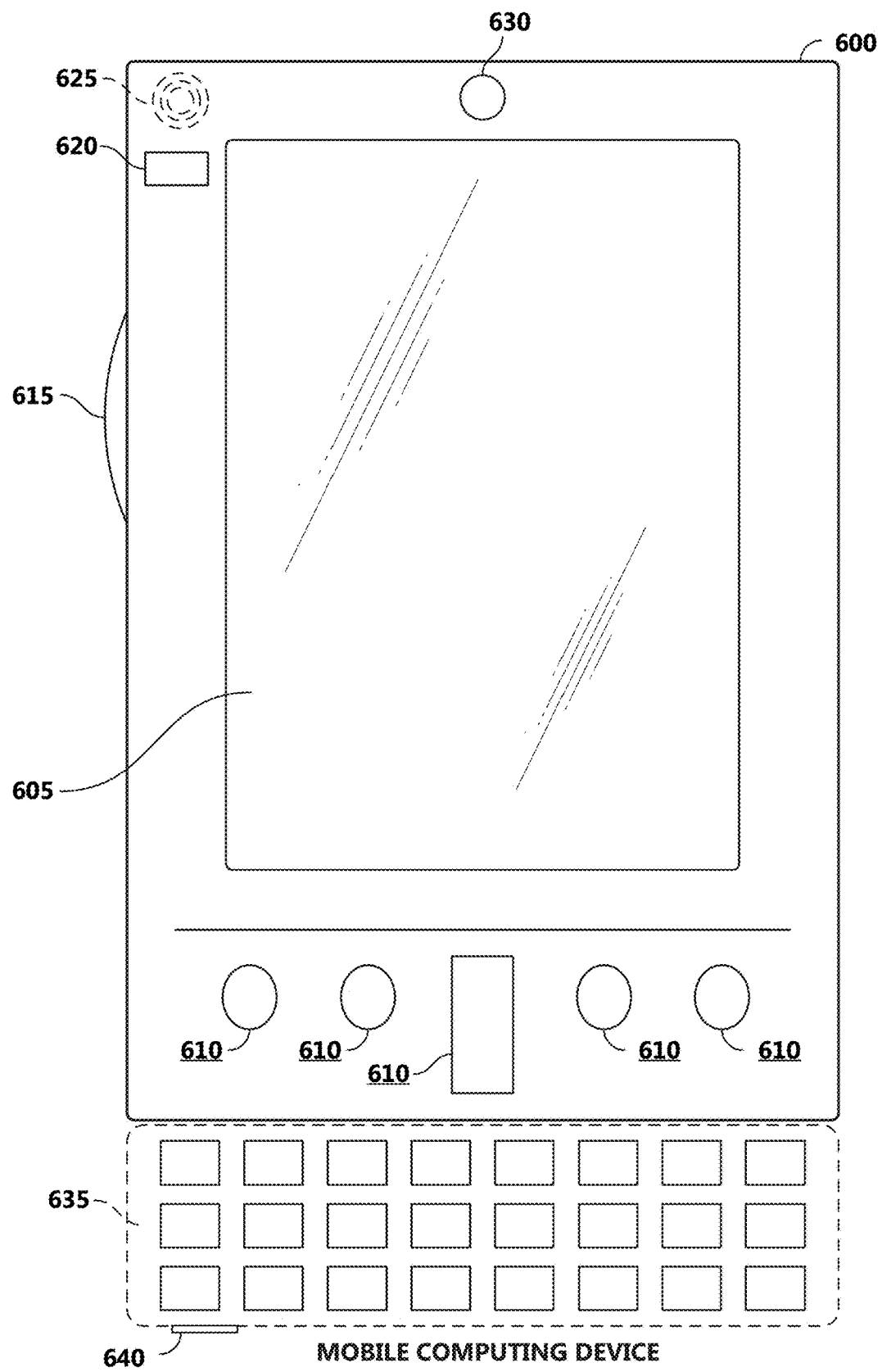
FIGS. 6A and 6B are block diagrams of a mobile computing device.
Figure 6B:
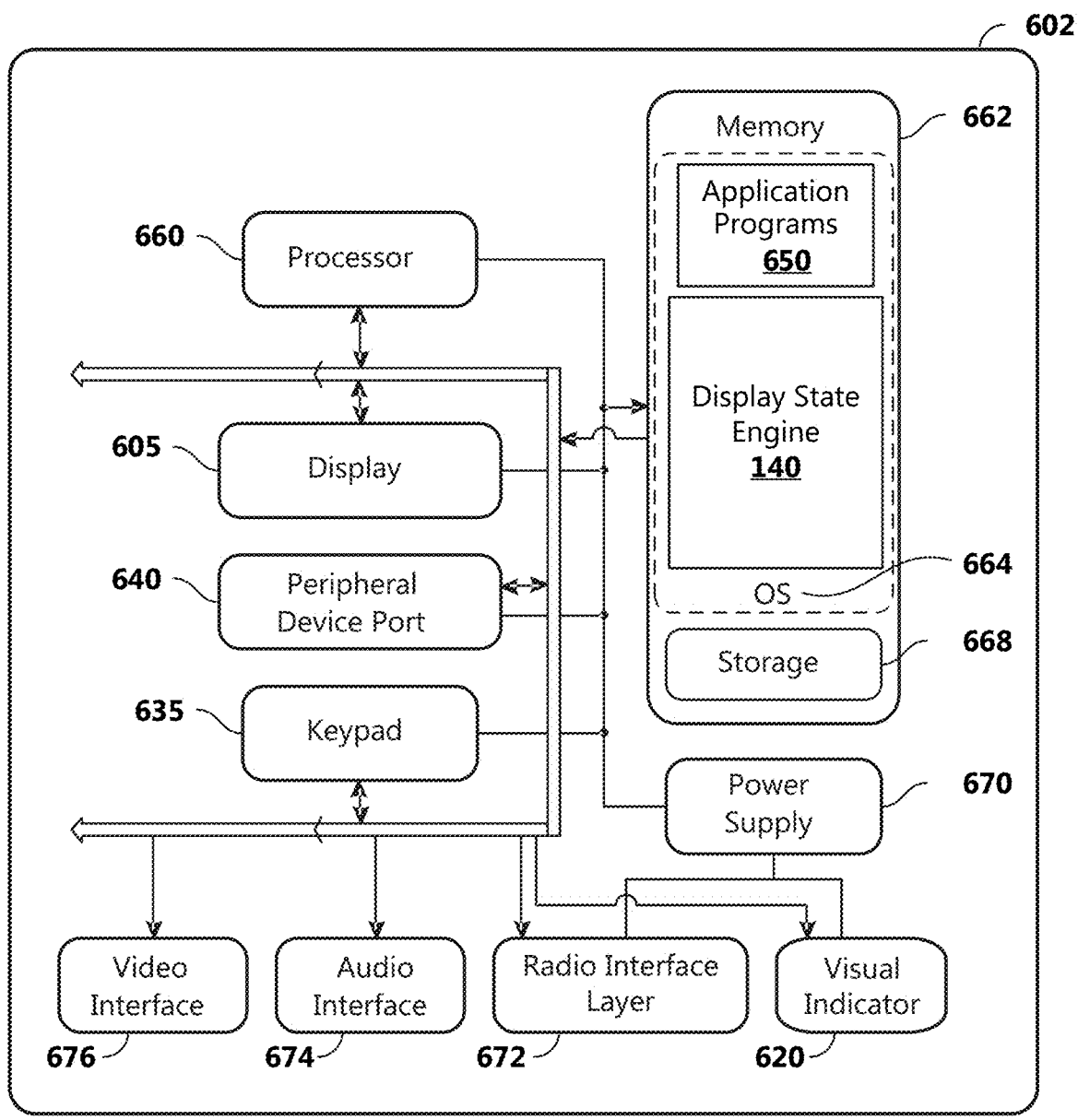
Figure 7:
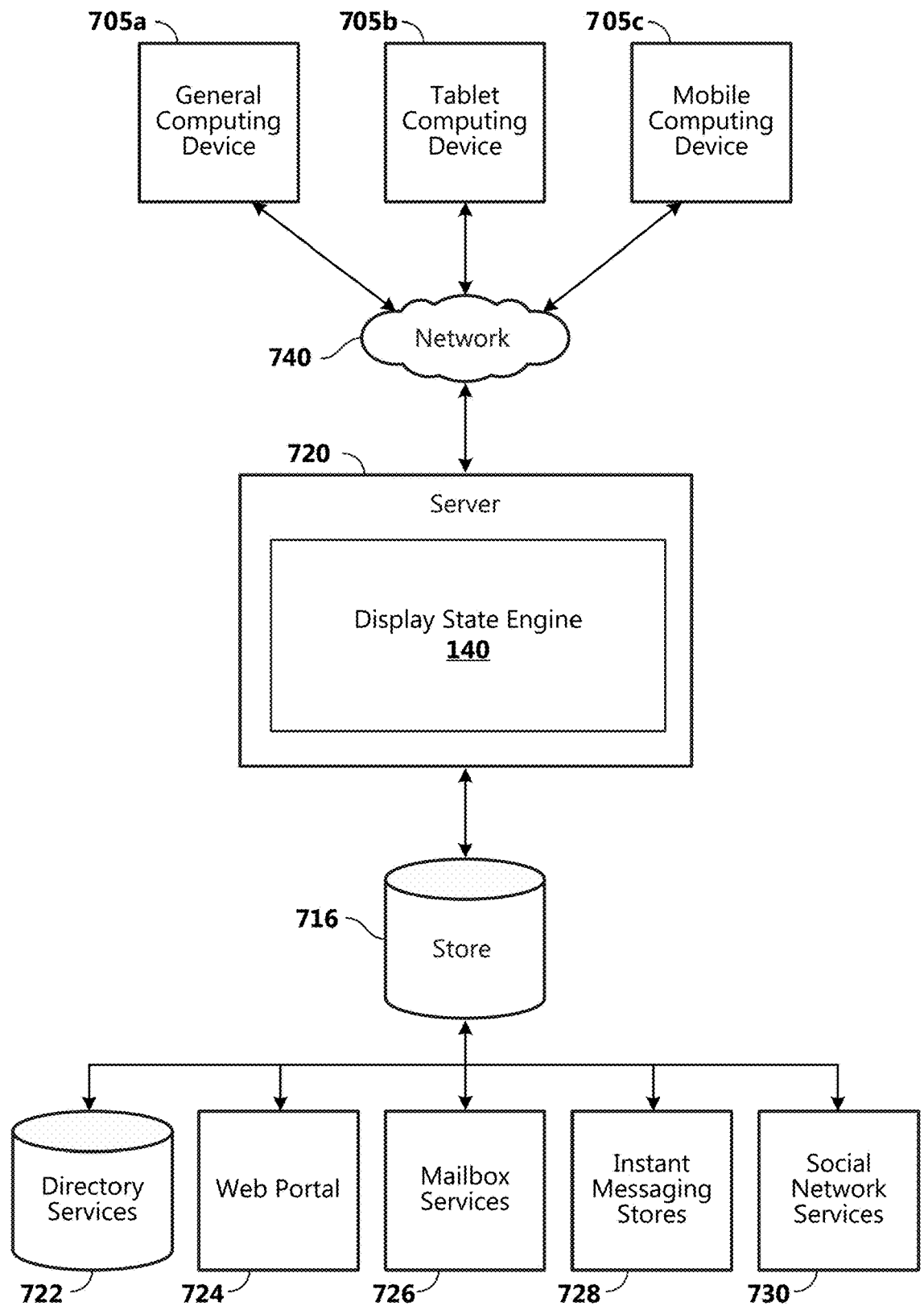
FIG. 7 is a block diagram of a distributed computing system.

FIGS. 5-7 and the associated descriptions provide a discussion of a variety of operating environments in which examples are practiced. However, the devices and systems illustrated and discussed with respect to FIGS. 5-7 are for purposes of example and illustration and are not limiting of a vast number of computing device configurations that are utilized for practicing aspects, described herein.

FIG. 5 is a block diagram illustrating physical components (i.e., hardware) of a computing device 500 with which examples of the present disclosure may be practiced. In a basic configuration, the computing device 500 includes at least one processing unit 502 and a system memory 504. According to an aspect, depending on the configuration and type of computing device, the system memory 504 comprises, but is not limited to, volatile storage (e.g., random access memory), non-volatile storage (e.g., read-only memory), flash memory, or any combination of such memories. According to an aspect, the system memory 504 includes an operating system 505 and one or more program modules 506 suitable for running software applications 550. According to an aspect, the system memory 504 includes the display state engine 140. The operating system 505, for example, is suitable for controlling the operation of the computing device 500. Furthermore, aspects are practiced in conjunction with a graphics library, other operating systems, or any other application program, and are not limited to any particular application or system. This basic configuration is illustrated in FIG. 5 by those components within a dashed line 508. According to an aspect, the computing device 500 has additional features or functionality. For example, according to an aspect, the computing device 500 includes additional data storage devices (removable and/or non-removable) such as, for example, magnetic disks, optical disks, or tape. Such additional storage is illustrated in FIG. 5 by a removable storage device 509 and a non-removable storage device 510.

As stated above, according to an aspect, a number of program modules and data files are stored in the system memory 504. While executing on the processing unit 502, the program modules 506 (e.g., display state engine 140) perform processes including, but not limited to, one or more of the stages of the method 400 illustrated in FIG. 4. According to an aspect, other program modules are used in accordance with examples and include applications 550 such as electronic mail and contacts applications, word processing applications, spreadsheet applications, database applications, slide presentation applications, drawing or computer-aided application programs, etc.

According to an aspect, aspects are practiced in an electrical circuit comprising discrete electronic elements, packaged or integrated electronic chips containing logic gates, a circuit utilizing a microprocessor, or on a single chip containing electronic elements or microprocessors. For example, aspects are practiced via a system-on-a-chip (SOC) where each or many of the components illustrated in FIG. 5 are integrated onto a single integrated circuit. According to an aspect, such an SOC device includes one or more processing units, graphics units, communications units, system virtualization units and various application functionality all of which are integrated (or "burned") onto the chip substrate as a single integrated circuit. When operating via an SOC, the functionality, described herein, is operated via application-specific logic integrated with other components of the computing device 500 on the single integrated circuit (chip). According to an aspect, aspects of the present disclosure are practiced using other technologies capable of performing logical operations such as, for example, AND, OR, and NOT, including but not limited to mechanical, optical, fluidic, and quantum technologies. In addition, aspects are practiced within a general purpose computer or in any other circuits or systems.

According to an aspect, the computing device 500 has one or more input device(s) 512 such as a keyboard, a mouse, a pen, a sound input device, a touch input device, etc. The output device(s) 514 such as a display, speakers, a printer, etc. are also included according to an aspect. The aforementioned devices are examples and others may be used. According to an aspect, the computing device 500 includes one or more communication connections 516 allowing communications with other computing devices 518. Examples of suitable communication connections 516 include, but are not limited to, radio frequency (RF) transmitter, receiver, and/or transceiver circuitry; universal serial bus (USB), parallel, and/or serial ports.

The term computer readable media as used herein include computer storage media. Computer storage media include volatile and nonvolatile, removable and non-removable media implemented in any method or technology for storage of information, such as computer readable instructions, data structures, or program modules. The system memory 504, the removable storage device 509, and the non-removable storage device 510 are all computer storage media examples (i.e., memory storage). According to an aspect, computer storage media includes RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. According to an aspect, any such computer storage media is part of the computing device 500. Computer storage media does not include a carrier wave or other propagated data signal.

According to an aspect, communication media is embodied by computer readable instructions, data structures, program modules, or other data in a modulated data signal, such as a carrier wave or other transport mechanism, and includes any information delivery media. According to an aspect, the term "modulated data signal" describes a signal that has one or more characteristics set or changed in such a manner as to encode information in the signal. By way of example, and not limitation, communication media includes wired media such as a wired network or direct-wired connection, and wireless media such as acoustic, radio frequency (RF), infrared, and other wireless media.

FIGS. 6A and 6B illustrate a mobile computing device 600, for example, a mobile telephone, a smart phone, a tablet personal computer, a laptop computer, and the like, with which aspects may be practiced. With reference to FIG. 6A, an example of a mobile computing device 600 for implementing the aspects is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. According to an aspect, the display 605 of the mobile computing device 600 functions as an input device (e.g., a touch screen display). If included, an optional side input element 615 allows further user input. According to an aspect, the side input element 615 is a rotary switch, a button, or any other type of manual input element. In alternative examples, mobile computing device 600 incorporates more or less input elements. For example, the display 605 may not be a touch screen in some examples. In alternative examples, the mobile computing device 600 is a portable phone system, such as a cellular phone. According to an aspect, the mobile computing device 600 includes an optional keypad 635. According to an aspect, the optional keypad 635 is a physical keypad. According to another aspect, the optional keypad 635 is a "soft" keypad generated on the touch screen display. In various aspects, the output elements include the display 605 for showing a graphical user interface (GUI), a visual indicator 620 (e.g., a light emitting diode), and/or an audio transducer 625 (e.g., a speaker). In some examples, the mobile computing device 600 incorporates a vibration transducer for providing the user with tactile feedback. In yet another example, the mobile computing device 600 incorporates input and/or output ports, such as an audio input (e.g., a microphone jack), an audio output (e.g., a headphone jack), and a video output (e.g., a HDMI port) for sending signals to or receiving signals from an external device. In yet another example, the mobile computing device 600 incorporates peripheral device port 640, such as an audio input (e.g., a microphone jack), an audio output (e.g., a headphone jack), and a video output (e.g., a HDMI port) for sending signals to or receiving signals from an external device.

FIG. 6B is a block diagram illustrating the architecture of one example of a mobile computing device. That is, the mobile computing device 600 incorporates a system (i.e., an architecture) 602 to implement some examples. In one example, the system 602 is implemented as a "smart phone" capable of running one or more applications (e.g., browser, e-mail, calendaring, contact managers, messaging clients, games, and media clients/players). In some examples, the system 602 is integrated as a computing device, such as an integrated personal digital assistant (PDA) and wireless phone.

According to an aspect, one or more application programs 650 are loaded into the memory 662 and run on or in association with the operating system 664. Examples of the application programs include phone dialer programs, e-mail programs, personal information management (PIM) programs, word processing programs, spreadsheet programs, Internet browser programs, messaging programs, and so forth. According to an aspect, the display state engine 140 is loaded into memory 662. The system 602 also includes a non-volatile storage area 668 within the memory 662. The non-volatile storage area 668 is used to store persistent information that should not be lost if the system 602 is powered down. The application programs 650 may use and store information in the non-volatile storage area 668, such as e-mail or other messages used by an e-mail application, and the like. A synchronization application (not shown) also resides on the system 602 and is programmed to interact with a corresponding synchronization application resident on a host computer to keep the information stored in the non-volatile storage area 668 synchronized with corresponding information stored at the host computer. As should be appreciated, other applications may be loaded into the memory 662 and run on the mobile computing device 600.

According to an aspect, the system 602 has a power supply 670, which is implemented as one or more batteries. According to an aspect, the power supply 670 further includes an external power source, such as an AC adapter or a powered docking cradle that supplements or recharges the batteries.

According to an aspect, the system 602 includes a radio 672 that performs the function of transmitting and receiving radio frequency communications. The radio 672 facilitates wireless connectivity between the system 602 and the "outside world," via a communications carrier or service provider. Transmissions to and from the radio 672 are conducted under control of the operating system 664. In other words, communications received by the radio 672 may be disseminated to the application programs 650 via the operating system 664, and vice versa.

According to an aspect, the visual indicator 620 is used to provide visual notifications and/or an audio interface 674 is used for producing audible notifications via the audio transducer 625. In the illustrated example, the visual indicator 620 is a light emitting diode (LED) and the audio transducer 625 is a speaker. These devices may be directly coupled to the power supply 670 so that when activated, they remain on for a duration dictated by the notification mechanism even though the processor 660 and other components might shut down for conserving battery power. The LED may be programmed to remain on indefinitely until the user takes action to indicate the powered-on status of the device. The audio interface 674 is used to provide audible signals to and receive audible signals from the user. For example, in addition to being coupled to the audio transducer 625, the audio interface 674 may also be coupled to a microphone to receive audible input, such as to facilitate a telephone conversation. According to an aspect, the system 602 further includes a video interface 676 that enables an operation of an on-board camera 630 to record still images, video stream, and the like.

According to an aspect, a mobile computing device 600 implementing the system 602 has additional features or functionality. For example, the mobile computing device 600 includes additional data storage devices (removable and/or non-removable) such as, magnetic disks, optical disks, or tape. Such additional storage is illustrated in FIG. 6B by the non-volatile storage area 668.

According to an aspect, data/information generated or captured by the mobile computing device 600 and stored via the system 602 is stored locally on the mobile computing device 600, as described above. According to another aspect, the data is stored on any number of storage media that is accessible by the device via the radio 672 or via a wired connection between the mobile computing device 600 and a separate computing device associated with the mobile computing device 600, for example, a server computer in a distributed computing network, such as the Internet. As should be appreciated such data/information is accessible via the mobile computing device 600 via the radio 672 or via a distributed computing network. Similarly, according to an aspect, such data/information is readily transferred between computing devices for storage and use according to well-known data/information transfer and storage means, including electronic mail and collaborative data/information sharing systems.

FIG. 7 illustrates one example of the architecture of a system for providing an efficient display of an email message as described above. Content developed, interacted with, or edited in association with the display state engine 140 is enabled to be stored in different communication channels or other storage types. For example, various documents may be stored using a directory service 722, a web portal 724, a mailbox service 726, an instant messaging store 728, or a social networking site 730. The display state engine 140 is operative to use any of these types of systems or the like for an efficient display of an email message, as described herein. According to an aspect, a server 720 provides the display state engine 140 to clients 705*a,b,c*. As one example, the server 720 is a web server providing the display state engine 140 over the web. The server 720 provides the display state engine 140 over the web to clients 705 through a network 740. By way of example, the client computing device is implemented and embodied in a personal computer 705*a*, a tablet computing device 705*b* or a mobile computing device 705*c* (e.g., a smart phone), or other computing device. Any of these examples of the client computing device are operable to obtain content from the store 716.

Implementations, for example, are described above with reference to block diagrams and/or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope.

We claim:

1. A computer-implemented method for causing a display of content to a recipient, comprising:
   receiving a message from a sender;
   parsing the message to identify at least one primary textual content element and at least one secondary content element, wherein the at least one secondary content element is a portion of content within a body of the message;
   analyzing each secondary content element to determine a display state, wherein analyzing includes:
      applying a value to each secondary content element based on a type of content;
      adjusting the value for each secondary content element based on an identity of the sender; and
      assigning one of a collapsed or an expanded display state for each secondary content element based on the adjusted value; and
   rendering the message to the recipient, wherein rendering includes:
      causing a display of the primary content elements and all secondary content elements having an expanded display state;
      hiding all secondary content elements having a collapsed display state; and
      causing a display of an expansion control for each hidden secondary content element to allow the recipient to expand the hidden element.

2. The computer-implemented method of claim 1, wherein applying a value to each secondary content element comprises applying a predetermined value associated with one of:
   an image;
   a video;
   a table; or
   a previous message of a conversation including the received message.

3. The computer-implemented method of claim 1, wherein adjusting the value comprises:
   determining an organizational relationship distance between the sender and the recipient; and
   applying a weight to the value, wherein the weight corresponds to the determined organizational relationship distance.

4. The computer-implemented method of claim 3, wherein applying the weight to the value comprises applying a weight that is higher as the organizational relationship distance between the sender and the recipient is greater and smaller as the organizational relationship distance between the sender and the recipient is smaller.

5. The computer-implemented method of claim 4, further comprising determining whether the adjusted value crosses a predetermined threshold value, wherein the secondary content element is hidden when the adjusted value crosses the predetermined threshold value and the secondary content element is displayed when the adjusted value does not cross the predetermined threshold value.

6. The computer-implemented method of claim 1, further comprising further adjusting the value for each secondary content element by a weight associated with a number of recipients to whom the message is addressed, wherein a greater number of recipients corresponds to a higher weight and increases a probability that a secondary content element will be assigned a collapsed display state.

7. The computer-implemented method of claim 1, further comprising further adjusting the value for one or more secondary content elements based on a prior action of the recipient expanding a same type of secondary content element that was assigned a collapsed display state in a previously-rendered message.

8. The computer-implemented method of claim 1, further comprising further adjusting the value for at least one secondary content element based on a prior action of the recipient expanding secondary content that was assigned a collapsed display state in a previously-rendered message from the same sender.

9. The computer-implemented method of claim 1, wherein rendering the message further comprises causing a display of a collapse control for each displayed secondary content element assigned the expanded display state to allow the recipient to collapse the displayed content.

10. The computer-implemented method of claim 9, further comprising further adjusting the value for at least one secondary content element based on at least one of:
    a prior action of the recipient collapsing a same type of secondary content element that was assigned an expanded display state in a previously-rendered message; or a prior action of the recipient collapsing a secondary content element that was assigned an expanded display state in a previously-rendered message from the same sender.

11. The computer-implemented method of claim 9, further comprising further adjusting the value for at least one secondary content element based on at least one of:
   a number of recipients to whom the message is addressed;
   a size of a display device; or
   whether the recipient is a primary recipient of the message or a secondary recipient of the message.

12. A system for causing a display of content to a recipient, the system comprising a computing device, the computing device comprising:
   at least one processing device; and
   at least one computer readable data storage device storing instructions that, when executed by the at least one processing device, is operative to:
      receive a message from a sender;
      parse the message to identify primary textual content elements and secondary content elements, wherein the secondary content elements are portions of content within a body of the message;
      analyze the secondary content elements to determine a display state for each secondary content element, wherein in analyzing, the system is operative to:
         apply a value to each secondary content element based on a type of content;
         adjust the value for each secondary content element based on an identity of the sender; and
         assign one of a collapsed or an expanded display state for each secondary content element based on the adjusted value; and
      render the message to the recipient, wherein in rendering, the system is operative to:
         cause a display of the primary content elements and all secondary content elements having an expanded display state;
         hide all secondary content elements having a collapsed display state; and
         cause a display of an expansion control for each hidden secondary content element to allow the recipient to expand the hidden element.

13. The system of claim 12, wherein in adjusting the value, the system is operative to:
   determine an organizational relationship distance between the sender and the recipient; and
   apply a weight to the value, wherein the weight corresponds to the determined organizational relationship distance.

14. The system of claim 13, wherein the system is further operative to:
   determine whether the adjusted value crosses a predetermined threshold value;
   when the adjusted value crosses the predetermined threshold value, the system is operative to assign the collapsed display state to the secondary content element; and
   when the adjusted value does not cross the predetermined threshold value, the system is operative to assign the expanded display state to the secondary content element.

15. The system of claim 12, wherein the system is further operative to further adjust the value for each secondary content element based on at least one of:
   a number of recipients to whom the message is addressed;
   a size of a display device coupled to the at least one processing device; or
   whether the recipient is a primary recipient of the message or a secondary recipient of the message.

16. The system of claim 12, wherein the system is further operative to further adjust the value for each secondary content element by a weight associated with a number of recipients to whom the message is addressed, wherein a greater number of recipients corresponds to a higher weight and increases a probability that a secondary content element will be assigned a collapsed display state.

17. The system of claim 12, wherein the system is further operative to further adjust the value for one or more secondary content elements based on one of:
   a prior action of the recipient expanding a same type of secondary content element that was assigned a collapsed display state in a previously-rendered message; or
   a prior action of the recipient expanding secondary content that was assigned a collapsed display state in a previously-rendered message from the same sender.

18. The system of claim 12, wherein the system is further operative to cause a display of a collapse control for each displayed secondary content element assigned the expanded display state to allow the recipient to collapse the displayed content.

19. The system of claim 18, wherein the system is further operative to:
   further adjust the value for at least one secondary content element based on a prior action of the recipient collapsing a same type of secondary content element that was assigned the expanded display state in a previously-rendered message; or
   further adjust the value for at least one secondary content element based on a prior action of the recipient collapsing a secondary content element that was assigned an expanded display state in a previously-rendered message from the same sender.

20. A computer storage medium including instructions, which when executed by a processing unit is operative to provide a display state engine for causing a display of content to a recipient, the display state engine operative to:
   receive a message from a sender;
   parse the message to identify primary textual content elements and secondary content elements, wherein the secondary content elements are portions of content within a body of the message;
   analyze the secondary content elements to determine a display state for each secondary content element, wherein in analyzing, the display state engine is operative to:
      apply a value to each secondary content element based on a type of content;
      adjust the value for each secondary content element based on an identity of the sender;
      further adjust the value for each secondary content element based on at least one of:
         a number of recipients to whom the message is addressed;
         a size of a display device; or
         a recipient involvement level based on whether the recipient is a primary recipient of the message or a secondary recipient of the message;
      assign one of a collapsed or an expanded display state for each secondary content element based on the adjusted value; and render the message to the recipient, wherein in rendering, the display state engine is operative to:
  cause a display of the primary content elements and all secondary content elements having an expanded display state;
  hide all secondary content elements having a collapsed display state; and
  cause a display of an expansion control for each hidden secondary content element to allow the recipient to expand the hidden element.

* * * * *